(12) United States Patent
Hirota et al.

(10) Patent No.: US 6,367,246 B1
(45) Date of Patent: Apr. 9, 2002

(54) EXHAUST GAS PURIFICATION DEVICE FOR INTERNAL COMBUSTION ENGINE

(75) Inventors: Shinya Hirota, Susono; Toshiaki Tanaka, Numazu, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/341,037

(22) PCT Filed: Apr. 21, 1998

(86) PCT No.: PCT/JP98/01823

§ 371 Date: Jul. 1, 1999

§ 102(e) Date: Jul. 1, 1999

(87) PCT Pub. No.: WO98/48153

PCT Pub. Date: Oct. 29, 1998

(30) Foreign Application Priority Data

Apr. 24, 1997 (JP) ............................................. 9-107575

(51) Int. Cl.[7] ................................................. F01N 3/00
(52) U.S. Cl. ............................. 60/295; 60/297; 60/289; 60/301; 55/DIG. 30; 55/283
(58) Field of Search ........................ 60/297, 295, 301, 60/289, 311, 320; 422/171; 55/DIG. 30, 283

(56) References Cited

U.S. PATENT DOCUMENTS

| 3,645,098 | A |   | 2/1972  | Templin et al. |         |
|-----------|---|---|---------|----------------|---------|
| 3,674,441 | A |   | 7/1972  | Nicole         |         |
| 4,631,076 | A | * | 12/1986 | Kurihara et al. | 55/283 |
| 5,388,406 | A | * | 2/1995  | Takeshima et al. | 60/297 |
| 5,473,887 | A | * | 12/1995 | Takeshima et al. | 60/297 |
| 5,473,890 | A | * | 12/1995 | Takeshima et al. | 60/285 |
| 5,538,697 | A | * | 7/1996  | Abe et al.     | 422/171 |
| 5,634,331 | A | * | 6/1997  | Aoki et al.    | 60/284  |
| 5,775,099 | A | * | 7/1998  | Ito et al.     | 60/274  |
| 6,058,700 | A | * | 5/2000  | Yamashita et al. | 60/297 |
| 6,167,696 | B1 | * | 1/2001 | Maaseidvaag et al. | 60/301 |

FOREIGN PATENT DOCUMENTS

| EP | 188 267 A   | * | 7/1986  | ............ 60/295 |
|----|-------------|---|---------|---------------------|
| JP | 47-7005     |   | 4/1972  |                     |
| JP | 6368714 A   | * | 3/1988  | ............ 60/295 |
| JP | 3-135417    |   | 6/1991  |                     |
| JP | 4-117136    |   | 4/1992  |                     |
| JP | 4-117136    |   | 10/1992 |                     |
| JP | 5-195755    |   | 8/1993  |                     |
| JP | 6-159037    |   | 6/1994  |                     |
| JP | 406272541 A | * | 9/1994  | ............ 60/320 |
| JP | 4-71237     |   | 3/1995  |                     |
| JP | 7-145725    |   | 6/1995  |                     |
| JP | 09125931 A  | * | 10/1995 |                     |
| JP | 7-332071    |   | 12/1995 |                     |
| JP | 8-284646    |   | 10/1996 |                     |
| JP | 9-53442     |   | 2/1997  |                     |
| JP | 9-79026     |   | 3/1997  |                     |
| JP | 9-85049     |   | 3/1997  |                     |
| JP | 9-100716    |   | 4/1997  |                     |
| JP | 2727906 B   | * | 3/1998  |                     |

* cited by examiner

Primary Examiner—Thomas Denion
Assistant Examiner—Thai-Ba Trieu
(74) Attorney, Agent, or Firm—Kenyon & Kenyon

(57) ABSTRACT

A particulate filter (18) is arranged in the exhaust passage of an engine. Only the inner wall surface of downstream end open cells (61d) of the particulate filter (18) is covered with a $NO_x$ adsorbent (62a), and the inner wall surface of the upstream end open cells (61u) is covered with a HC adsorbent (63a). The particulates in the exhaust gas are trapped in the HC adsorbent (63a) or the cell walls (60) of the particulate filter (18) and prevented from reaching the $NO_x$ adsorbent (62a). When the catalyst temperature is low, $NO_x$ in the in flowing exhaust gas is adsorbed in the $NO_x$ adsorbent (62a), and hydrocarbon (HC) is adsorbed in the HC adsorbent (63a). With the increase in the catalyst temperature, the adsorbed $NO_x$ is desorbed from the $NO_x$ adsorbent (62a), and the adsorbed HC is desorbed from the HC adsorbent (63a). This HC reduces the $NO_x$ desorbed from the $NO_x$ adsorbent (62a).

40 Claims, 17 Drawing Sheets

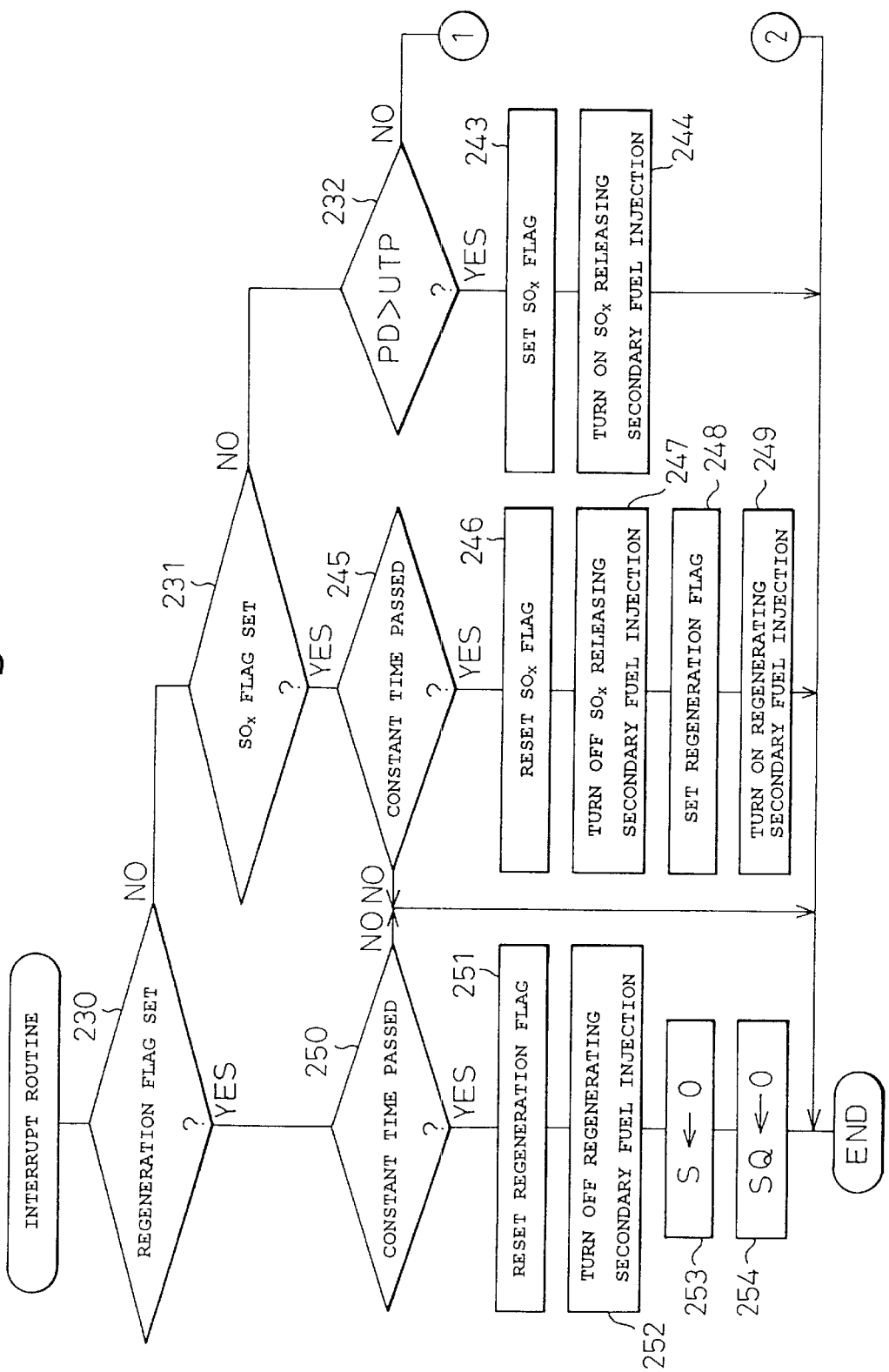

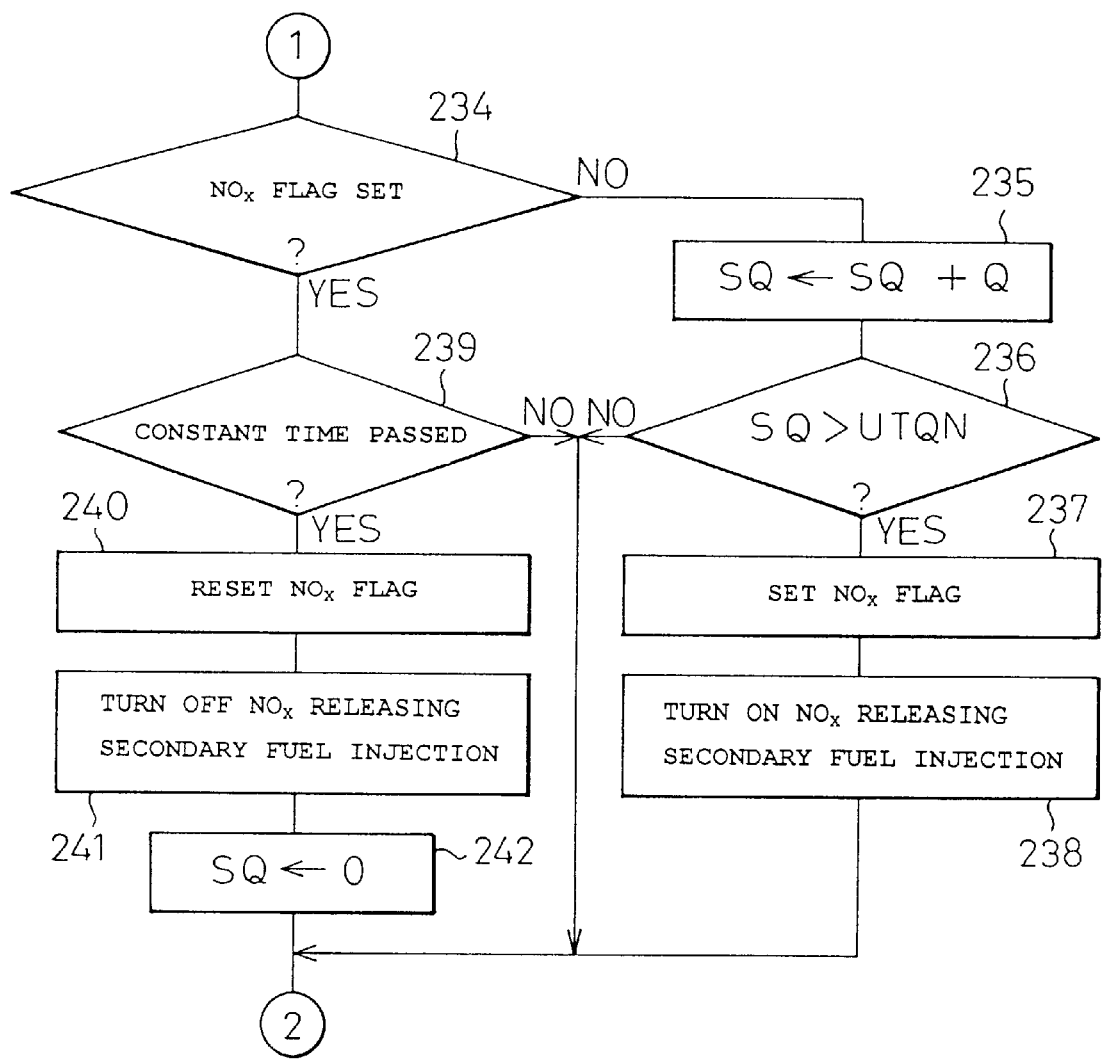

EXHAUST GAS PURIFICATION DEVICE FOR INTERNAL COMBUSTION ENGINE

TECHNICAL FIELD

The present invention relates to an exhaust gas purification device for an internal combustion engine.

BACKGROUND ART

Japanese Unexamined Patent Publication (Kokai) No. 6-159037 discloses an exhaust gas purification device, for a diesel engine, in which a filter for trapping particulates in the exhaust gas is arranged in the exhaust passage of the engine and both of the upstream and downstream side surfaces of the filter with respect to the exhaust gas flow are covered with a $NO_x$ storing member for storing the nitrogen oxide $NO_x$ temporarily. Generally, the exhaust gas of the diesel engine contains particulates, i.e. the soot (carbon) and soluble organic components (SOF), and $NO_x$. Releasing these particulates into the atmosphere is not desirable. For this reason, the exhaust purification device traps the particulates in a filter and stores $NO_x$ in the accumulation member.

The $NO_x$ storing member covering the upstream side surface of the filter with respect to the exhaust gas flow, however, comes into contact with the exhaust gas containing the particulates. The problem, therefore, is that once the $NO_x$ storing member is poisoned by the particulates, it cannot satisfactorily store $NO_x$ any longer.

DISCLOSURE OF THE INVENTION

An object of the present invention is to provide an exhaust gas purification device capable of securing the $NO_x$ storage capacity of the $NO_x$ storing member.

According to the present invention, there is provided an exhaust gas purification device, for an internal combustion engine having an exhaust passage, comprising a filter arranged in the exhaust gas passage for trapping the particulates in the inflowing exhaust gas and a $NO_x$ storing member arranged only on the downstream side surface of the filter with respect to the exhaust gas for temporarily storing the $NO_x$ in the inflowing exhaust gas therein.

BRIEF DESCRIPTION OF THE DRAWINGS

FIGS. 16A and 16B are flowcharts showing an interrupt routine according to the embodiment of FIG. 15.

BEST MODE FOR CARRYING OUT THE INVENTION

The embodiments described below represent the cases in which the present invention is applied to a diesel engine. However, the present invention is also applicable to an engine of the spark ignition type.

Figure 1:
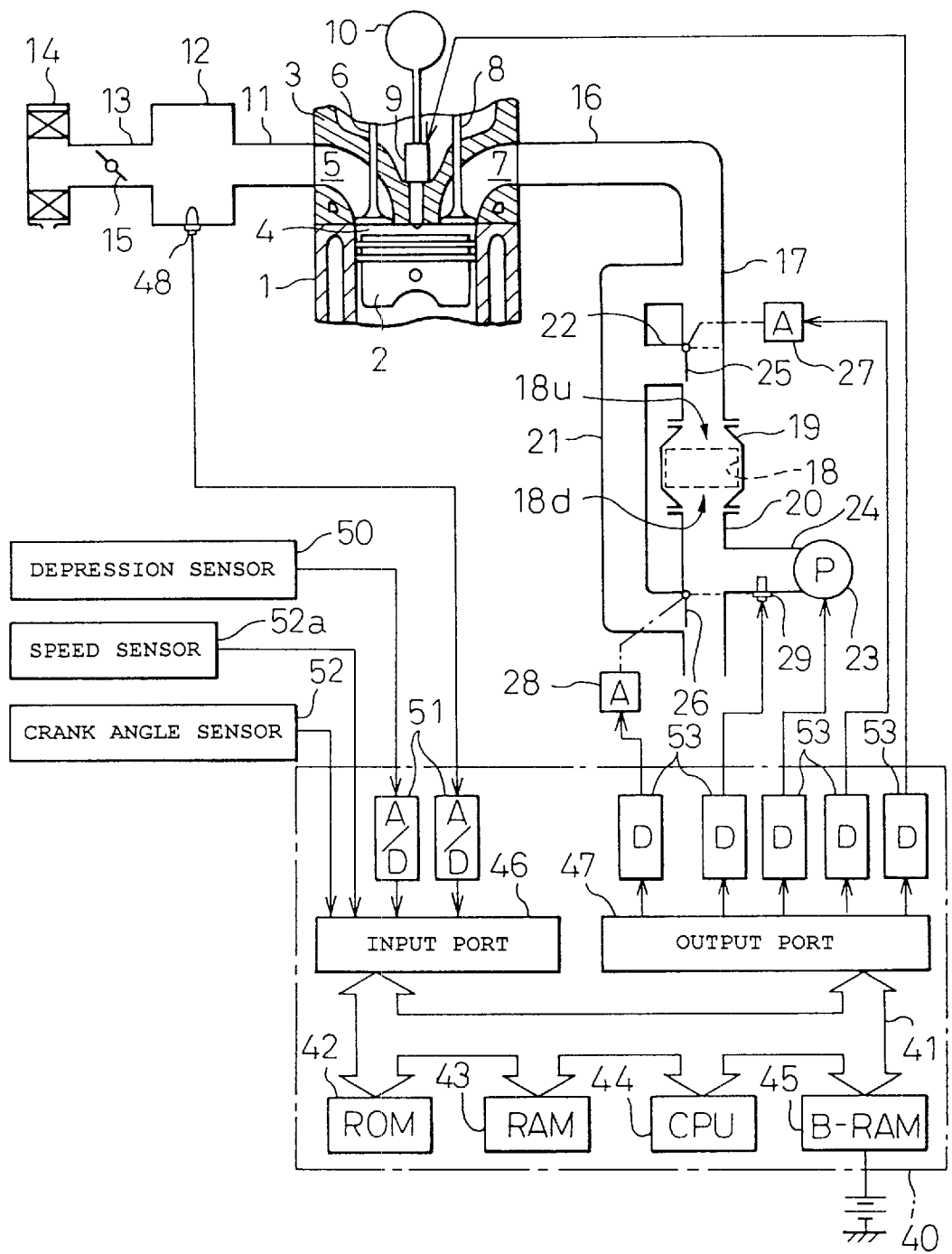
FIG. 1 is a general view of a diesel engine.

Referring to FIG. 1, 1 designates a cylinder block, 2 designates a piston, 3 designates a cylinder head, 4 designates a combustion chamber, 5 designates an intake port, 6 designates an intake valve, 7 designates an exhaust port, 8 designates an exhaust valve, 9 designates a fuel injector of electromagnetic type for injecting the fuel directly into the combustion chamber 4, and 10 designates a fuel accumulator for distributing the fuel discharged from a fuel pump (not shown) into the fuel injectors 9. The intake port 5 of each cylinder is connected to a common surge tank 12 through a corresponding intake branch 11, and the surge tank 12 is connected to an air cleaner 14 through an intake duct 13. An intake air throttle valve 15 is arranged in the intake duct 13. The exhaust port 7 of each cylinder, on the other hand, is connected to a common exhaust manifold 16. This exhaust manifold 16 is connected to a catalyst converter 19 housing a particulate filter 18 therein, through an exhaust pipe 17. The catalyst converter 19 is connected to a muffler (not shown) through an exhaust pipe 20. Note that each fuel injector 9 is controlled based on an output signal from an electronic control unit 40.

The diesel engine of FIG. 1 includes a bypass pipe 21 connecting the exhaust pipe 17 and the exhaust pipe 20 to each other bypassing the catalyst converter 19, an exhaust pipe 22 extending from the exhaust pipe 17 downstream with respect to the exhaust gas flow from the connection point with the bypass pipe 21 and reaching the bypass pipe 21, and a secondary air introduction pipe 24 extending from the exhaust pipe 20 upstream of the connection point with the bypass pipe 21 and reaching the discharge side of a secondary air pump 23 of engine drive type, for example. The operation of the secondary air pump 23 is normally stopped. Also, switch valves 25, 26 are arranged in the exhaust pipe 17 and the exhaust pipe 20, respectively. These switch valves 25, 26 are selectively positioned, at a first position indicated by solid line in FIG. 1 or a second position indicated by dashed line in FIG. 1, by corresponding actuators 27 and 28, respectively.

The switch valves 25, 26 are normally located at the first position. In the case where the switch valves 25, 26 are both located at the first position, the bypass pipe 21 and the exhaust pipe 22 are shut off, the exhaust manifold 16 communicates with an exhaust gas upstream end 18u of the particulate filter 18, and the exhaust gas downstream end 18d of the particulate filter 18 communicates with the muffler. In the case where both the switch valves 25, 26 are located at the second position, in contrast, the bypass pipe 21 and the exhaust pipe 22 are opened. As a result, the exhaust manifold 16 communicates with the muffler through the bypass pipe 21 without communicating with the exhaust gas upstream end 18u of the particulate filter 18, the exhaust gas upstream end 18u of the particulate filter 18 communicates with the muffler through the exhaust pipe 22 and the bypass pipe 21, and the secondary air introduction pipe 24 communicates with the exhaust gas downstream end 18d of the particulate filter 18 without communicating with the bypass pipe 21 and the muffler. Note that the secondary air pump 23 and the switch valves 25, 26 are controlled based on the output signal of the electronic control unit 40, respectively.

Further, referring to FIG. 1, a heating unit 29 for heating the secondary air discharged from the secondary air pump 23 is arranged in the secondary air introduction pipe 24. In this embodiment, the heating unit 29 is formed by a burner. The operation of the burner 29 is normally stopped, and is activated upon activation of the secondary air pump 23. Note that the burner 29 is controlled based on the output signal from the electronic control unit 40.

The electronic control unit (ECU) 40 is configured of a digital computer including a ROM (read-only memory) 42, a RAM (random access memory) 43, a CPU (microprocessor) 44, a B-RAM (backup RAM) 45, an input port 46 and an output port 47 connected to each other through a bidirectional bus 41. The surge tank 12 has mounted thereon a negative pressure sensor 48 generating an output voltage proportional to the negative pressure in the surge tank 12. Also, a depression sensor 50, generating an output voltage proportional to the depression DEP of an accelerator pedal (not shown), is provided. The output voltages from the negative pressure sensor 48 and the depression sensor 50 are each input to the input port 46 through a corresponding AD converter 51. The CPU 44 calculates the intake air amount Q based on the output voltage of the negative pressure sensor 48. Further, the input port 46 is connected to a crank angle sensor 52 generating an output pulse for each 30° rotation, for example, of the crankshaft, and a speed sensor 52a generating an output pulse in a period proportional to the vehicle speed. The CPU 44 calculates the engine speed N based on the output pulse from the crank angle sensor 52. On the other hand, the output port 47 is connected to each fuel injector 9, the secondary air pump 23, the actuators 27, 28 and the burner 29 through corresponding drive circuits 53, respectively.

Figure 2:
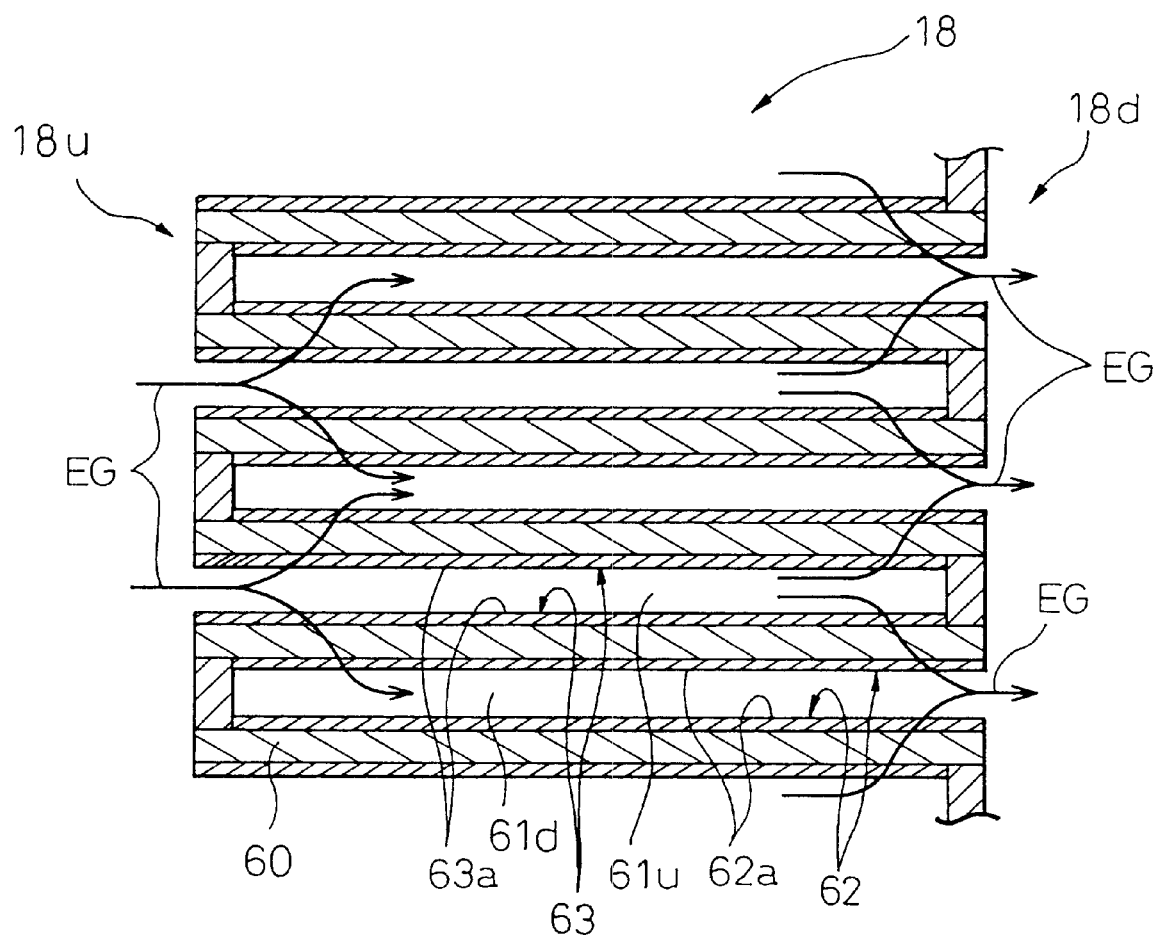
FIG. 2 is a partially enlarged sectional view of a particulate filter.

The particulate filter 18 is for trapping the particulates, i.e. the soot (carbon) and the soluble organic components (SOF) in the exhaust gas discharge from the engine. Referring to FIG. 2 showing a partial enlarged sectional view, the particulate filter 18 includes a plurality of cells defined by a cell wall 60 formed of a porous material such as a ceramic, and extending substantially in parallel to the exhaust passage axis. These cells are formed by alternate arrangement of upstream end open cells 61u with the exhaust gas upstream end 18u being opened and the exhaust gas downstream end 18d being closed, and downstream end open cells 61d with the upstream end 18u being closed and the downstream end 18d being opened. Further, the inner wall surface of the downstream end open cells 61d making up the exhaust gas downstream side surface of the particulate filter 18 is covered with a $NO_x$ storing member 62 for temporarily storing $NO_x$ in the inflowing exhaust gas therein, while the inner wall surface of the upstream end open cells 61u making up the exhaust gas upstream side surface of the particulate filter 18 is covered with a poisoning material removing member 63 for preventing the poisoning material from reaching the $NO_x$ storing member 62. As a result, as indicated by arrows EG in FIG. 2, the exhaust gas that has flowed in the catalyst converter 19 first flows into the upstream end open cells 61u and then passing through the poisoning material removing member 63, the cell wall 60 and the $NO_x$ storing member 62 in that order, flows into the downstream end open cells 61d, and thus flows out of the catalyst converter 19.

The $NO_x$ storing member 62 is formed of a $NO_x$ adsorbent 62a. This $NO_x$ adsorbent 62a is comprised of at least one selected from a precious metal including palladium Pd, platinum Pt, and rhodium Rh, a transition metal including copper Cu and iron Fe, and lithium Li, carried on a carrier of alumina, for example. This $NO_x$ storing member 62a stores the $NO_x$ contained in the inflowing exhaust gas when the temperature of the adsorbent 62a is low and releases the stored $NO_x$ when the temperature of the $NO_x$ adsorbent 62a increases. At this time, if a reducing agent exists around the $NO_x$ adsorbent 62a, $NO_x$ is reduced even in an oxidizing atmosphere. The mechanism by which $NO_x$ is stored is not entirely clear. However, it is considered that $NO_x$ in the inflowing exhaust gas is adsorbed chemically in the form of $NO_2$ on the surface of the platinum Pt particles. In this case, NO in the inflowing exhaust gas is considered to be adsorbed on the surface of the particulates of platinum Pt after being oxidized into $NO_2$ on the surface of the particulates of platinum Pt. This is also the case where the $NO_x$ adsorbent 62a carries other precious metals or transition metals.

On the other hand, the poisoning material removing member 63 is formed of a HC adsorbent 63a. This HC adsorbent 63a is comprised of at least one selected from a precious metal including platinum Pt and palladium Pd and a transition metal including copper Cu and iron Fe carried on a carrier of zeolite. This HC adsorbent 63a stores the gas-phase hydrocarbon (HC) in the inflowing exhaust gas therein when the temperature of the HC adsorbent 63a is low, and releases the stored HC when the temperature of the HC adsorbent 63a increases. The mechanism by which HC is adsorbed in this case is not entirely clear. However, the HC in the inflowing exhaust gas is considered to be physically adsorbed in the pores of zeolite. Note that zeolite largely containing silica such as ZSM-5 type, ferrierite or mordenite can be used as the zeolite.

Incidentally, in the diesel engine, the mean air-fuel ratio of the air-fuel mixture to be combusted in the combustion chamber 4 is normally kept leaner than the stoichiometric air-fuel ratio in order to reduce the smoke and particulates emitted from the engine. As a result, the amount of $NO_x$ to be purified is overwhelmingly larger in amount than the unburned HC or the like discharged from the diesel engine. In other words, the reducing agent for sufficiently purifying the $NO_x$ runs short. For this reason, in addition to the normal fuel injection effected around the top dead center in compression stroke, the second fuel injection, i.e. the secondary fuel injection is carried out by the fuel injectors 9 in expansion stroke or exhaust stroke, whereby the fuel (hydrocarbon) constituting a reducing agent is supplied secondarily into the exhaust gas. Note that the fuel injected by this secondary fuel injection hardly contributes to the engine output. Also, in the secondary fuel injection, the fuel is injected in an amount required for purifying the $NO_x$ discharged from the engine. The amount of $NO_x$ discharged from the engine can be estimated from the engine operating conditions, and therefore the amount of the secondary fuel injection can be determined in accordance with the engine operating conditions. This secondary fuel injection is referred to as a supplying secondary fuel injection, hereinafter.

Next, an exhaust gas purification method according to the present invention will be explained with reference to FIGS. 3A, 3B and 4.

The switch valves 25, 26 are normally located at the respective first positions. As a result, the exhaust gas discharged from the engine flows into the catalyst converter 19 through the exhaust pipe 17, and after passing through the particulate filter 18, flows into the exhaust pipe 20. In the meantime, the operations of the secondary air pump 23 and the burner 29 are both stopped. As described with reference to FIG. 2, the exhaust gas that has flowed into the catalyst converter 19 flows into the upstream end open cells 61u of the particulate filter 18, and then, after passing through the HC adsorbent 63a, the cell wall 60 and the $NO_x$ adsorbent 62a in that order, flows into the downstream end open cells 61d. In the process, as shown in FIGS. 3A and 3B, the particulates P in the inflowing exhaust gas are trapped on the surface of the HC adsorbent 63a or in the cell wall 60, thereby preventing the particulates from being released into the atmosphere.

Figure 3A:
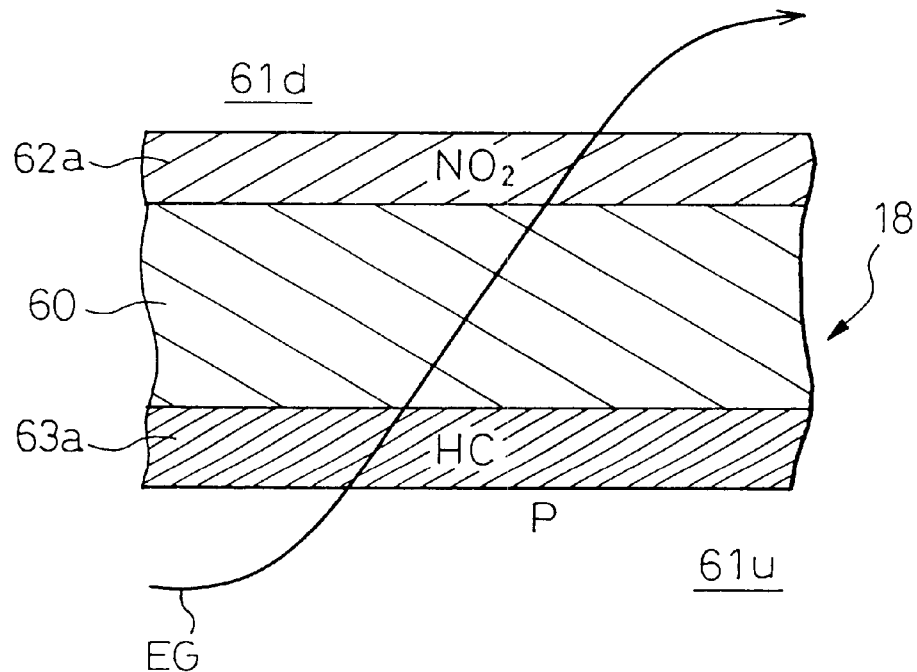
FIGS. 3A, 3B, and 4 are views for explaining a method of exhaust gas purification according to the embodiment of FIG. 1.

When the temperature of the $NO_x$ adsorbent 62a and the HC adsorbent 63a is low such as when the engine is running under light load, for example, as shown in FIG. 3A, the gas-phase HC (fuel) in the inflowing exhaust gas, i.e. the unburned HC discharged from the combustion chamber 4 and the HC component due to the supplying secondary fuel injection are adsorbed in the HC adsorbent 63a. $NO_x$ in the inflowing exhaust gas, after passing through the HC adsorbent 63a and the cell wall 60 in that order, is adsorbed into the $NO_x$ adsorbent 62a in the form of $NO_2$. As a result, $NO_x$ and HC are prevented from being discharged into the atmosphere.

In this case, the $NO_x$ adsorbent 62a is disposed not on the exhaust gas upstream side but only on the exhaust gas downstream side of the HC adsorbent 63a and the cell wall 60, and therefore almost no particulates and HC reach the $NO_x$ adsorbent 62a. As a result, the $NO_x$ adsorbent 62a is prevented from being poisoned by the particulates and the HC. Thus, the $NO_x$ adsorption capacity of the $NO_x$ adsorbent 62a can be maintained.

Figure 3B:
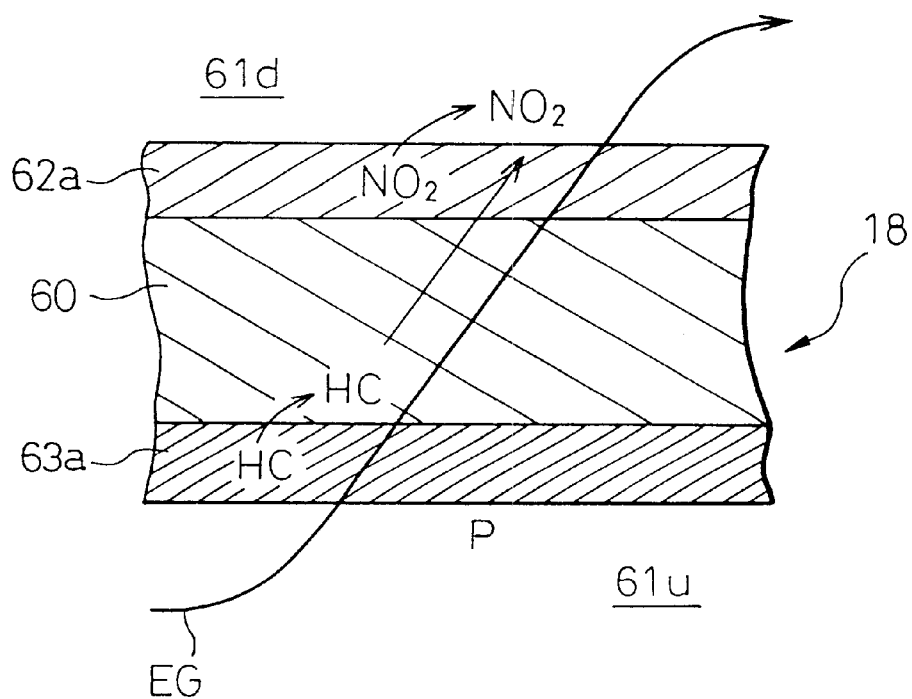

When the engine operating conditions changes to increase the temperature of the exhaust gas flowing into the particulate filter 18 and thereby the temperature of the $NO_x$ adsorbent 62a and the HC adsorbent 63a increases, as shown in FIG. 3B, the HC desorbs from the HC adsorbent 63a. This HC, riding on the flow of the exhaust gas, passes through the cell wall 60 and reaches the $NO_x$ adsorbent 62a. On the other hand, the $NO_x$ which has adsorbed in the $NO_x$ adsorbent 62a is desorbed therefrom, and this $NO_x$ is reduced by the HC desorbed from the HC adsorbent 63a. As a result, in this case too, $NO_x$ and HC are prevented from being discharged into the atmosphere. Consequently, regardless of the engine operating conditions, i.e. regardless of the temperature of the $NO_x$ adsorbent 62a and the HC adsorbent 63a, $NO_x$ and HC can be prevented from being discharged into the atmosphere. In addition, according to this embodiment, the adsorption capacity of the $NO_x$ adsorbent 62a and the HC adsorbent 63a can be secured without any special control.

On the other hand, it is necessary to periodically perform a regeneration operation in which the particulates trapped in the particulate filter 18 are removed. If the particulate filter 18 is heated while in the oxidation atmosphere, however, the particulates are burned off from the particulate filter 18. In view of this, according to this embodiment, the particulates trapped in the particulate filter 18 are burnt off by supplying the high-temperature secondary air to the particulate filter 18.

Specifically, in the case where the regeneration of the particulate filter 18 is required, the switch valves 25, 26 are located at the second position, respectively, and the secondary air pump 23 and the burner 29 are both activated. As a result, the exhaust gas discharged from the engine flows through the bypass pipe 21 bypassing the particulate filter 18. The secondary air, which is heated by the burner 29 after discharged from the secondary air pump 23, flows through the particulate filter 18 from the exhaust gas downstream end 18d and flows out of the exhaust gas upstream end 18u. Thus, the particulates trapped in the particulate filter 18 are burnt, and the particulate filter 18 is regenerated. Note that the secondary air is heated so that the temperature of the particulate filter 18 increases to beyond 600° C., for example.

In this way, according to this embodiment, the secondary air is rendered to flow reversely from the exhaust gas downstream end 18d toward the exhaust gas upstream end 18u of the particulate filter 18, and therefore the ashes generated by the burning of the particulates can be sufficiently removed from the particulate filter 18.

Figure 4:
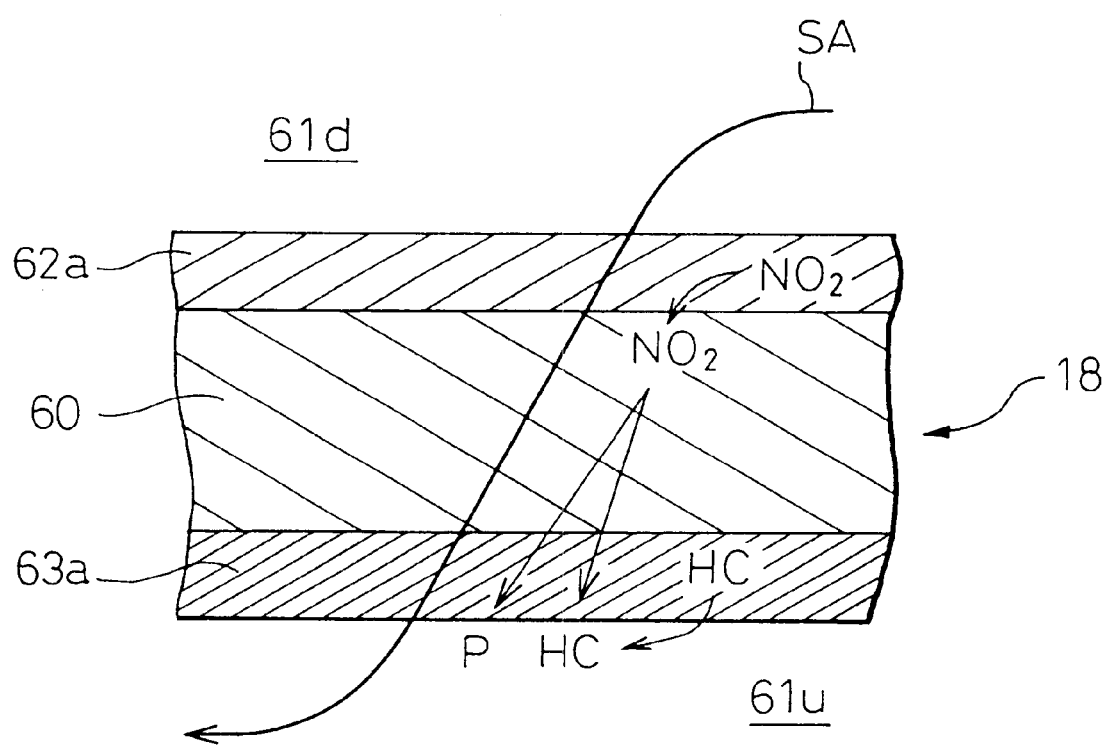

The high-temperature secondary air SA flowing into the catalyst converter 19 at the time of the regenerating operation of the particulate filter 18, as shown in FIG. 4, first flows into the downstream end open cells 61d, and then passing through the $NO_x$ adsorbent 62a, the cell wall 60 and the HC adsorbent 63a in that order, flows out of the catalyst converter 19 through the upstream end open cells 61u. As a result, both the $NO_x$ adsorbent 62a and the HC adsorbent 63a are heated, and the adsorbed $NO_x$ is desorbed from the $NO_x$ adsorbent 62a, and the adsorbed HC is desorbed from the HC adsorbent 63a. The $NO_x$ that desorbed from the $NO_x$ adsorbent 62a, riding on the flow of the secondary air, passes through the cell wall 60 and the HC adsorbent 63a, and reacts with the particulates P and HC. As a result, $NO_x$ is reduced and purified, while at the same time the particulates and HC are oxidized and removed. Consequently, $NO_x$ and HC desorbed from the $NO_x$ adsorbent 62a and the HC adsorbent 63a, respectively, are prevented from being discharged into the atmosphere at the time of regeneration of the particulate filter 18. Note that the supplying secondary fuel injection is stopped when regenerating the particulate filter 18.

Simultaneously with the regenerating operation of the particulate filter 18 in this way, the desorptions of $NO_x$ from the $NO_x$ adsorbent 62a and of HC from the HC adsorbent 63a are performed. As a result, not only the ability of the particulate filter 18 to trap particulates can be secured by the regeneration of the particulate filter 18 but also the adsorption capability of the $NO_x$ adsorbent 62a and the HC adsorbent 63a can be secured at the same time.

As long as the particulate filter 18 is not saturated with particulates and the $NO_x$ adsorbent 62a is not saturated with $NO_x$ and the HC adsorbent 63a is not saturated with HC, the particulate filter 18 may be regenerated at any time. According to the embodiment of FIG. 1, the particulate filter 18 is regenerated in accordance with the amount of particulates trapped in the particulate filter 18. Specifically, the amount of particulates trapped in the particulate filter 18 is estimated in accordance with the engine operating conditions. When the estimated amount of trapped particulates exceeds a preset value (for example, 50% of the maximum trap amount of the particulate filter 18), the operation for regenerating the particulate filter 18 is performed. With an increase in the accumulated mileage of the vehicle, on the other hand, the amount of particulates trapped will increase. In view of this, the accumulated mileage S of the vehicle is detected, and when this accumulated mileage S exceeds an upper threshold value UTS, it is judged that the estimated amount of particulates trapped has exceeded the preset value.

As described above, simultaneously with the operation of regenerating the particulate filter 18, the desorptions of $NO_x$ from the $NO_x$ adsorbent 62a and of HC from the HC adsorbent 63a are performed. According to this embodiment, therefore, the desorptions of $NO_x$ from the $NO_x$ adsorbent 62a and of HC from the HC adsorbent 63a are performed in accordance with the amount of particulates trapped in the particulate filter 18.

Also, the operation for regenerating the particulate filter 18 causes the exhaust gas of the engine to be discharged into the atmosphere bypassing the particulate filter 18, as described above. As a result, the particulates and $NO_x$ discharged from the engine are discharged into the atmosphere at this time. With the decrease in the engine load, on the other hand, the amount of particulates and $NO_x$ discharged from the engine per unit time decreases. According to this embodiment, therefore, the operation of regenerating the particulate filter 18 is prohibited when the engine is running under heavy load, and is performed when the engine is running under light load.

Figure 5:
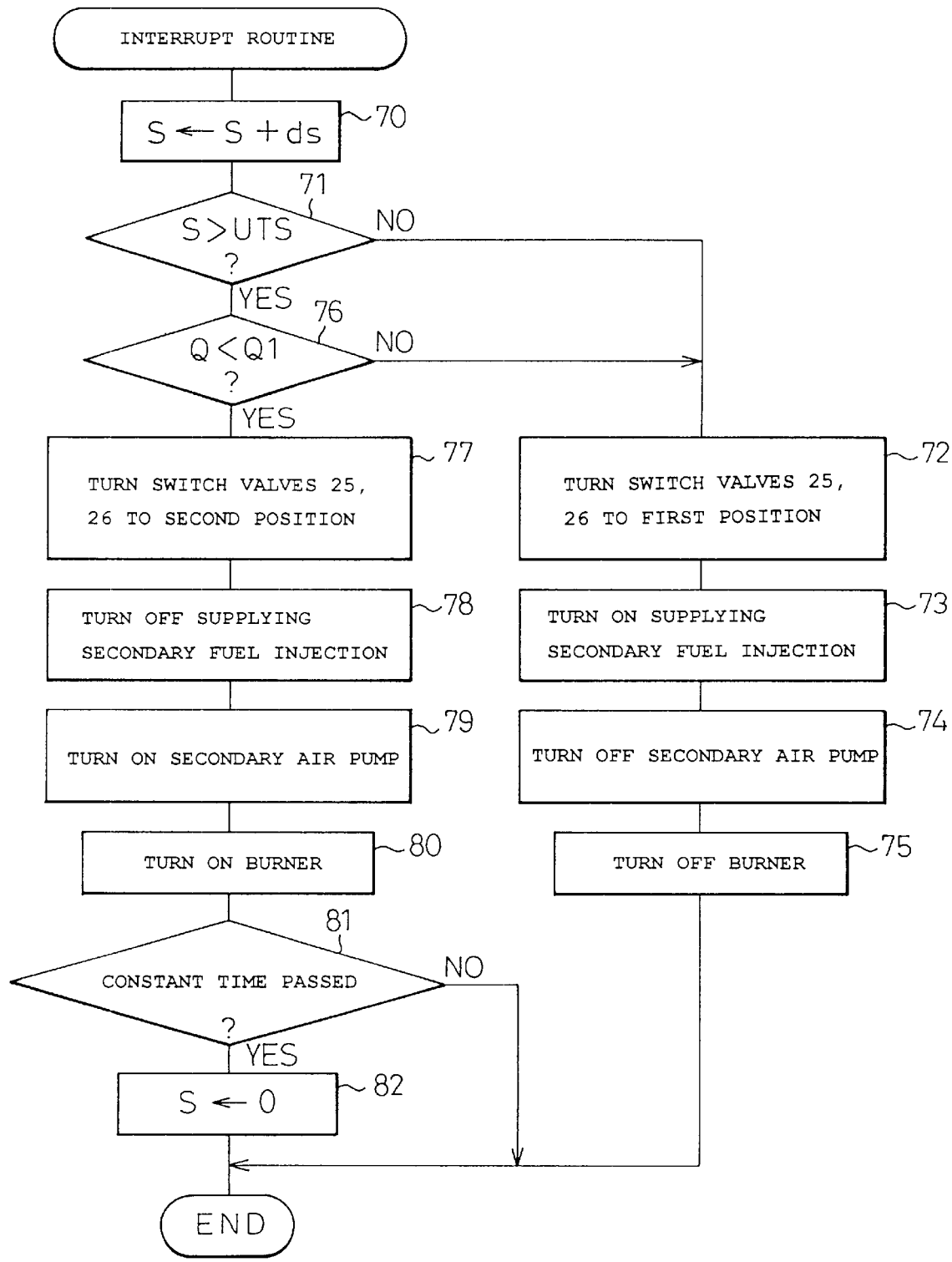
FIG. 5 is a flowchart showing an interrupt routine.

FIG. 5 shows a routine for executing the embodiment described above. This routine is executed by interrupt for each preset time.

Referring to FIG. 5, first, in step 70, the mileage ds from the previous interrupt to the present interrupt is calculated from the output pulses of a speed sensor 52a, and this mileage ds is added to the accumulated mileage S. In the next step 71, it is judged whether the accumulated mileage S is larger than an upper threshold UTS. In the case where S≦UTS, the process proceeds to step 72, where both the switch valves 25, 26 are located at the first position. In the next step 73, the supplying secondary fuel injection is carried out. In the next steps 74 and 75, the operation of the secondary air pump 23 and the burner 29 are stopped. Then, the processing cycle is ended. Therefore, at this time, the regeneration the particulate filter 18, and the desorptions of $NO_x$ from the $NO_x$ adsorbent 62a and HC from the HC adsorbent 63a are stopped.

When S>UTS in step 71, in contrast, the process proceeds to step 76, where it is judged whether the intake air amount Q representing the engine load is smaller than a preset amount Q1. In the case where Q≧Q1, i.e. when the engine is running under heavy load, the process proceeds to step 72. The regeneration the particulate filter 18 is thus stopped in this case. In the case where Q<Q1, i.e. when the engine is running under light load, on the other hand, the process proceeds from step 76 to 77, where the regeneration $NO_x$ desorption, and the HC desorption are started.

Specifically, in step 77, both the switch valves 25, 26 are located at the second position. In the next step 78, the supplying secondary fuel injection is stopped. In the next steps 79 and 80, the secondary air pump 23 and the burner 29 are activated. In the next step 81, it is judged whether a constant time has elapsed from the regeneration, the $NO_x$ desorption, and the HC desorption are started. Until the constant time has elapsed, the processing cycle is ended. With the lapse of the constant time, on the other hand, the process proceeds to step 82, where the accumulated mileage S is cleared. Once the accumulated mileage S is cleared, the process proceeds in the next processing cycle from step 71 to 72, where the regeneration, the $NO_x$ desorption, and the HC desorption are stopped.

Now, the diesel engine of FIG. 1 according to another embodiment will be explained.

According to this embodiment, the desorption of HC from the HC adsorbent 63a is performed in accordance with the amount of HC adsorbed in the HC adsorbent 63a. Specifically, the amount of HC adsorbed in the HC adsorbent 63a is estimated based on the engine operating conditions, for example, and in the case where this estimated HC amount is greater than a preset amount (for example, 50% of the maximum amount of HC adsorbed in the HC adsorbent 63a), the HC desorption is performed. With the increase in the accumulated value of the engine load, on the other hand, the accumulated value of the amount of $NO_x$ discharged from the engine increases, and so does the amount of $NO_x$ adsorbed in the $NO_x$ adsorbent 62a. In the supplying secondary fuel injection, HC of an amount sufficient to reduce $NO_x$ adsorbed in the $NO_x$ adsorbent 62a is supplied. With the increase in the accumulated value of the engine load, therefore, the amount of HC adsorbed in the HC adsorbent 63a increases. In view of this, the accumulated value SQ of the engine load is determined, and when this accumulated value SQ exceeds the upper threshold UTQ, it is judged that the estimated adsorbed HC amount has exceeded the preset value.

According to this embodiment, on the other hand, the switch valves 25, 26 are both held at the first position, while the temperature of the exhaust gas flowing into the catalyst converter 19 is increased to heat the HC adsorbent 63a, and thereby the desorption of HC from the HC adsorbent 63a is performed. Thus, as in the case explained with reference to FIG. 3B, the $NO_x$ adsorbent 62a is also heated by the high-temperature exhaust gas. Therefore, the $NO_x$ adsorbed in the $NO_x$ adsorbent 62a is desorbed from the $NO_x$ adsorbent 62a. In other words, according to this embodiment, the desorption of $NO_x$ from the $NO_x$ adsorbent 62a is performed in accordance with the amount of HC adsorbed in the HC adsorbent 63a. Note that the HC desorbed from the HC adsorbent 63a reaches the $NO_x$ adsorbent 62a riding the flow of the exhaust gas, and reduces the $NO_x$ desorbed from the $NO_x$ adsorbent 62a.

To increase the temperature of the exhaust gas flowing into the catalyst converter 19, the exhaust gas flowing in the exhaust manifold 16 may be heated by mounting an electric heater, for example, on the exhaust manifold 16. If the fuel due to the secondary fuel injection burns in the combustion chamber 4, however, the temperature of the exhaust gas flowing into the catalyst converter 19 increases. According to this embodiment, the secondary fuel injection is carried out in the expansion stroke or the exhaust stroke of the engine earlier than the supplying secondary fuel injection timing thereby to burn the secondary fuel, and thus to increase the temperature of the exhaust gas flowing into the catalyst converter 19. If this secondary fuel injection is referred to as a desorbing secondary fuel injection, the amount of the fuel injected by the desorbing secondary fuel injection is the one required for maintaining the temperature of the exhaust gas flowing into the catalyst converter 19 at a temperature required for the $NO_x$ desorption of the $NO_x$ adsorbent 62a and the HC desorption of the HC adsorbent 63a. This fuel amount is obtained in advance. The fuel injected by the desorbing secondary fuel injection also hardly contributes to the engine output. Note that, the desorbing secondary fuel injection is stopped when the supplying secondary fuel injection is carried out.

Figure 6:
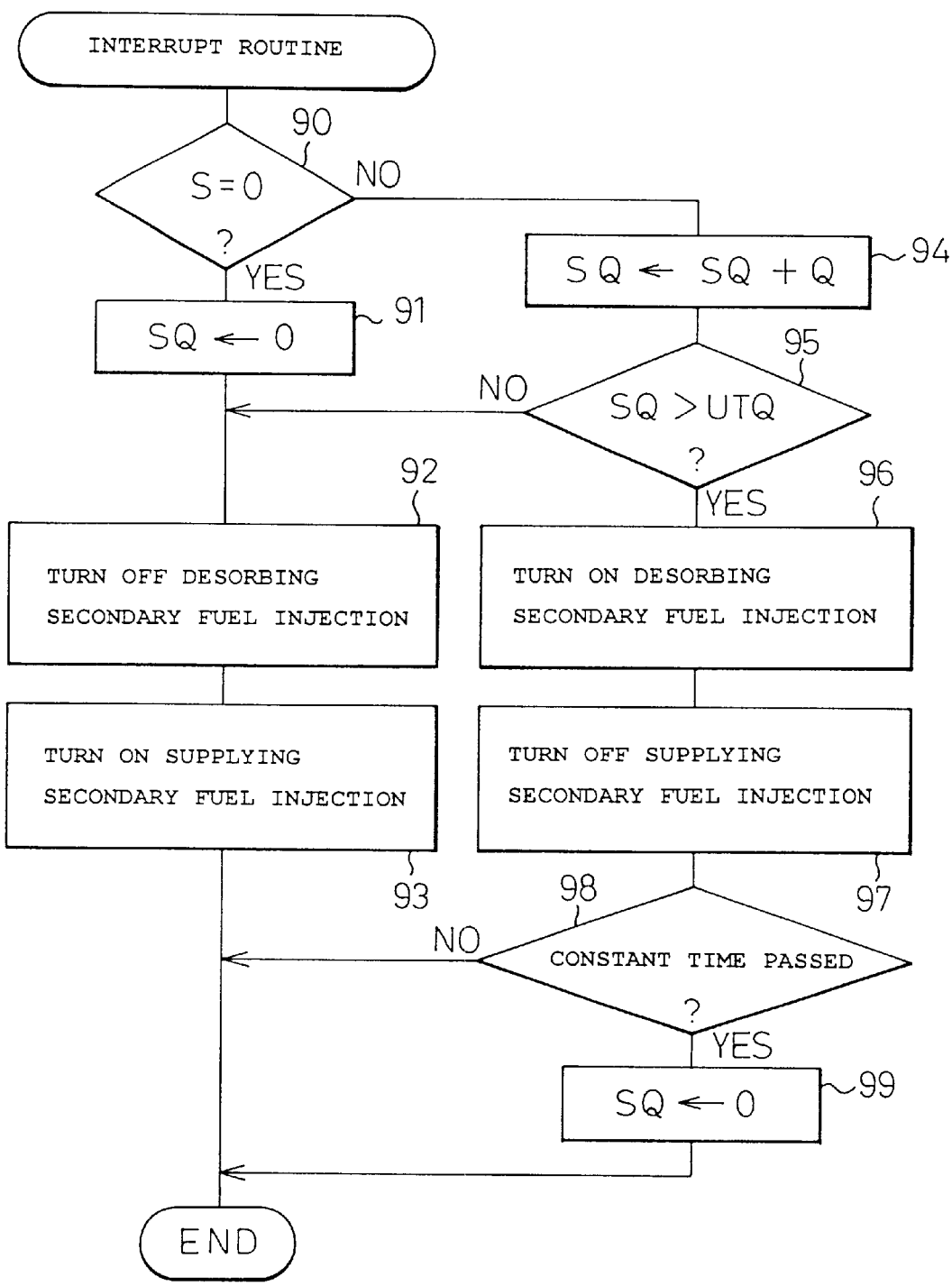
FIG. 6 is a flowchart showing an interrupt routine according to another embodiment.

FIG. 6 shows the routine for executing the embodiment described above. This routine is executed by the interrupt for each preset time.

Referring to FIG. 6, first, in step 90, it is judged whether the accumulated mileage S, which is calculated in the routine of FIG. 5, is zero. In the case where S=0, the process proceeds to step 91, where the accumulated value SQ of the intake air amount is cleared. In the next step 92, the desorbing secondary fuel injection is stopped. In the next step 93, the supplying secondary fuel injection is performed. Then the processing cycle is ended. Namely, in this case, the $NO_x$ desorption of the $NO_x$ adsorbent 62a and the HC desorption of the HC adsorbent 63a are stopped.

Also according to this embodiment, the regeneration of the particulate filter 18 is performed in accordance with the amount of particulates trapped in the particulate filter 18. Specifically, the routine of FIG. 5 is executed. When the regeneration of the particulate filter 18 is complete, the $NO_x$ desorption of the $NO_x$ adsorbent 62*a* and the HC desorption of the HC adsorbent 63*a* have also been completed. In this case, there is no need to increase the temperature of the exhaust gas flowing into the catalyst converter 19 to perform the HC desorption of the HC adsorbent 63*a*. In the routine of FIG. 5, on the other hand, the accumulated mileage S is reduced to zero upon completion of the regeneration of the particulate filter 18. According to this embodiment, therefore, when S=0, the HC desorption of the HC adsorbent 63*a* by increasing the temperature of the exhaust gas flowing into the catalyst converter 19, is stopped.

In the case where S>0, in contrast, the process proceeds to step 94, where the present amount of intake air Q is added to the accumulated value SQ of the intake air amount. In the next step 95, it is judged whether the accumulated value SQ is larger than the upper threshold UTQ. In the case where S≦UTQ, the process proceeds to step 92. Specifically, in this case, the $NO_x$ desorption and the HC desorption are stopped. When SQ>UTQ, on the other hand, the process proceeds to step 96, where the $NO_x$ desorption and the HC desorption are started.

Specifically, in step 96, the desorbing secondary fuel injection is carried out. In the next step 97, the supplying secondary fuel injection is stopped. In the next step 98, it is judged whether a constant time has passed from the start of the $NO_x$ desorption and the HC desorption. Before the constant time passes, the processing cycle is ended. In the case where the constant time has passed, in contrast, the process proceeds to step 99, where the accumulated intake air amount SQ is cleared. Once the accumulated intake air amount SQ is cleared, the process proceeds from step 95 to step 92 in the next processing cycle, thus the $NO_x$ desorption and the HC desorption are stopped.

Figure 7:
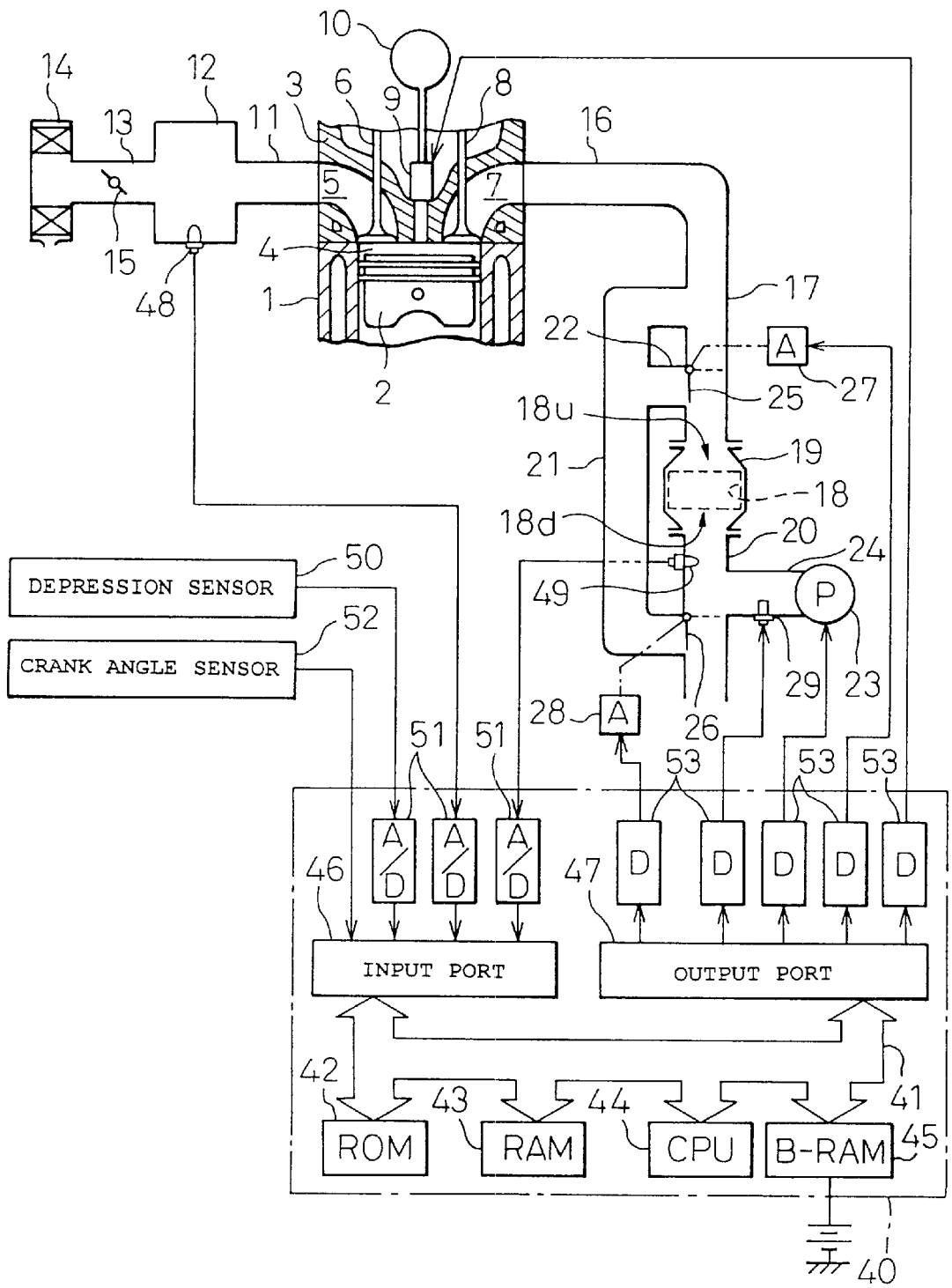
FIG. 7 is a general view of the diesel engine according to another embodiment.

FIG. 7 shows another embodiment. Referring to FIG. 7, this embodiment is different in a point of the configuration from the diesel engine shown in FIG. 1 in that a $NO_x$ concentration sensor 49 is arranged in the exhaust pipe 20 facing the exhaust gas downstream end 18*d* of the particulate filter 18. This $NO_x$ concentration sensor 49 generates an output voltage proportional to the concentration of the $NO_x$ in the exhaust gas flowing in the exhaust pipe 20, and this output voltage is input to the input port 46 through a corresponding AD converter 51.

According to this embodiment, the $NO_x$ desorption of the $NO_x$ adsorbent 62*a* is performed in accordance with the amount of $NO_x$ adsorbed in the $NO_x$ adsorbent 62*a*. Specifically, with the increase in the amount of $NO_x$ adsorbed in the $NO_x$ adsorbent 62*a*, a part of the NO$x$ flowing in the particulate filter 18 is discharged out of the particulate filter 18 without being adsorbed in the $NO_x$ adsorbent 62*a*. For this reason, when the $NO_x$ concentration C detected by the $NO_x$ concentration sensor 49 exceeds an upper threshold UTC, it is judged that the amount of $NO_x$ adsorbed in the $NO_x$ adsorbent 62*a* has exceeded a preset value (50%, for example, of the maximum amount of $NO_x$ adsorbed in the $NO_x$ adsorbent 62*a*), and the $NO_x$ desorption is performed.

According to this embodiment, as in the embodiment of FIG. 1, the high-temperature secondary air is supplied in reverse direction in the particulate filter 18 to perform the $NO_x$ desorption of the $NO_x$ adsorbent 62*a*. In the process, therefore, the regeneration of the particulate filter 18 and the HC desorption of the HC adsorbent 63*a* are performed at the same time. In other words, in this embodiment, the regeneration of the particulate filter 18 and the HC desorption of the HC adsorbent 63*a* are performed in accordance with the amount of $NO_x$ adsorbed in the $NO_x$ adsorbent 62*a*.

Figure 8:
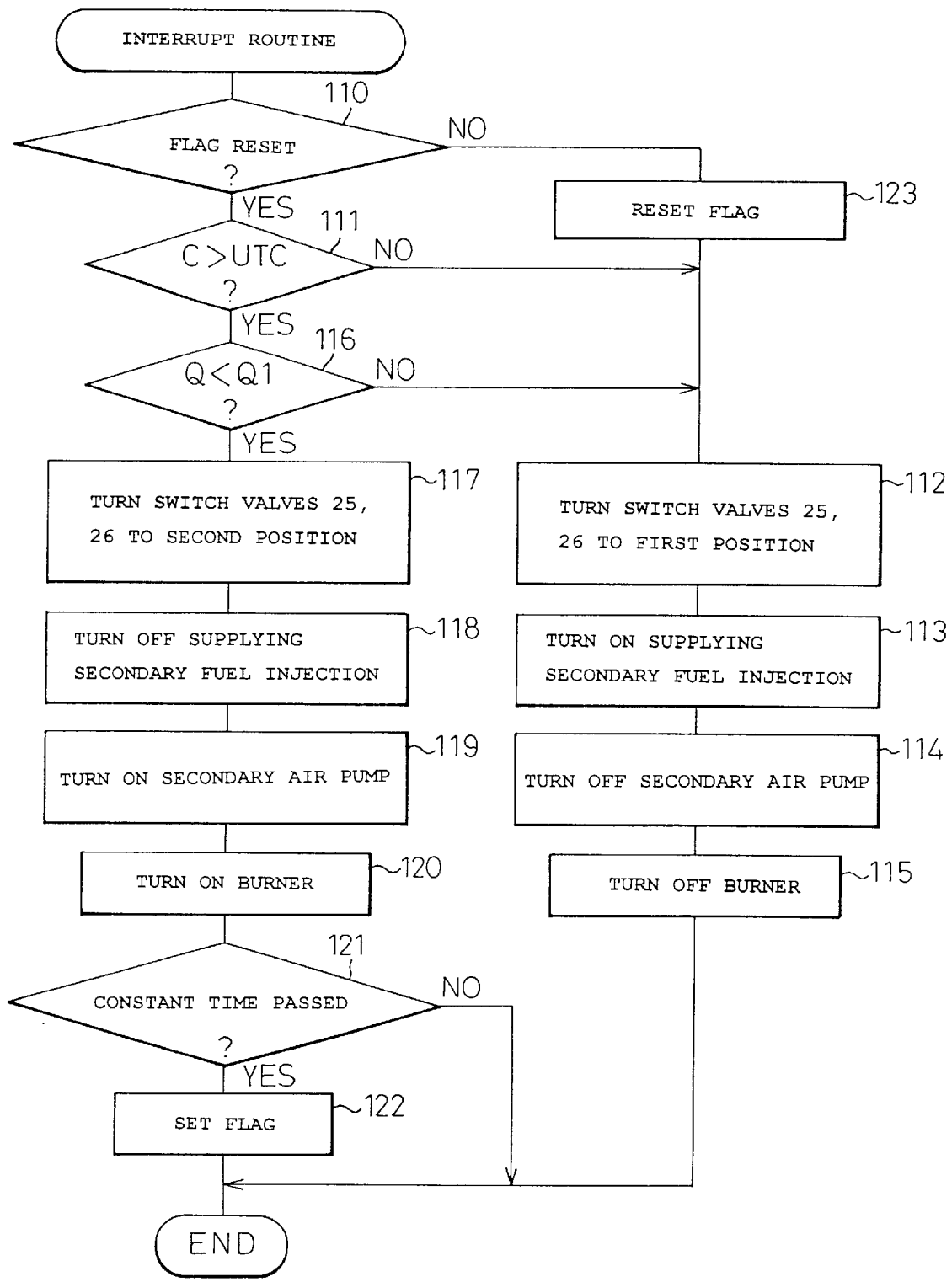
FIG. 8 is a flowchart showing an interrupt routine according to the embodiment of FIG. 7.

FIG. 8 shows the routine for executing the embodiment mentioned above. This routine is executed by an interrupt at intervals of a preset time.

Referring to FIG. 8, first, in step 110, it is judged whether a flag is reset, which flag is to be set when the regeneration, the $NO_x$ desorption and the HC desorption are to be ended, and is to be reset when the regeneration, the $NO_x$ desorption and the HC desorption are actually ended. In the case where the flag is reset, the process proceeds to step 111, where it is judged whether the $NO_x$ concentration C detected by the $NO_x$ concentration sensor 49 is larger than the upper threshold UTC. In the case where C≦UTC, the process proceeds to step 112, where both the switch valves 25, 26 are located at the first position. In the next step 113, the supplying secondary fuel injection is carried out. In the next steps 114 and 115, the operations of the secondary air pump 23 and the burner 29 are stopped. Then, the processing cycle is ended. In other words, in this case, the regeneration, the $NO_x$ desorption and the HC desorption are stopped.

In the case where C>UTC in step 111, in contrast, the process proceeds to step 116, where it is judged whether the intake air amount Q is smaller than a preset amount Q1. In the case where Q≧Q1, i.e. in the case where the engine is running under heavy load, the process proceeds to step 112, where the regeneration, the $NO_x$ desorption and the HC desorption are stopped. When Q<Q1, i.e. when the engine is running under light load, in contrast, the process proceeds from step 116 to step 117, where the regeneration, the $NO_x$ desorption and the HC desorption are started.

Specifically, in step 117, both the switch valves 25, 26 are located at the second position. In the next step 118, the supplying secondary fuel injection is stopped. In the next steps 119 and 120, the secondary air pump 23 and the burner 29 are activated. In the next step 121, it is judged whether a constant time has passed after the start of the regeneration, the $NO_x$ desorption and the HC desorption. Before the constant time has passed, the processing cycle is ended. Upon the lapse of the constant time, the process proceeds to step 122, where the flag is set. Once the flag is set, the process proceeds from step 110 to step 123 in the next processing cycle to reset the flag. After the flag is thus reset, the process proceeds to step 112. In this way, the regeneration, the $NO_x$ desorption and the HC desorption are ended.

Figure 9:
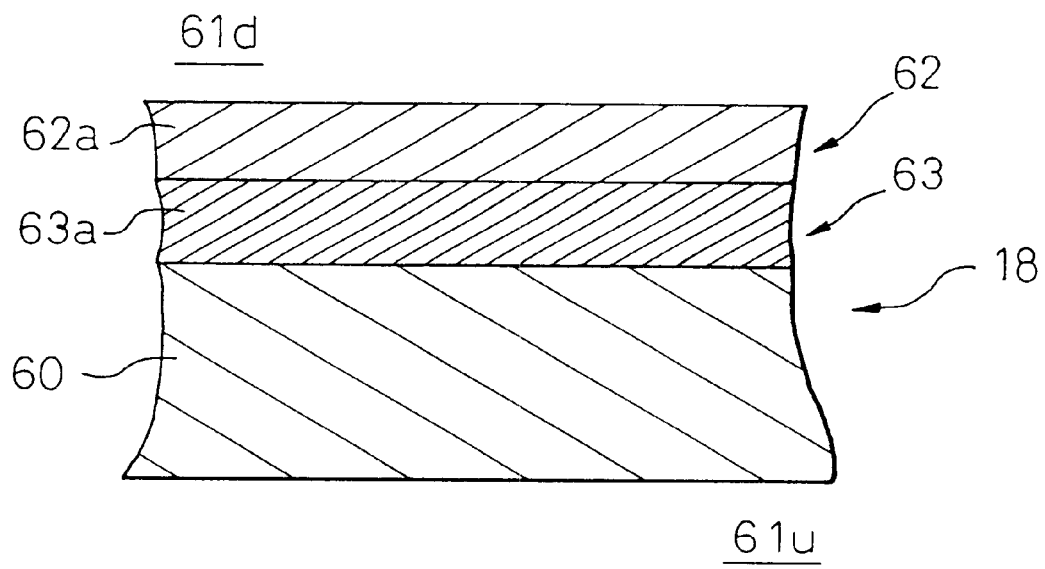
FIG. 9 is a partially enlarged sectional view of a particulate filter according to another embodiment.

FIG. 9 shows the particulate filter 18 according to another embodiment.

Referring to FIG. 9, the side surface of the downstream open end cells 60*d*, i.e. the exhaust gas downstream side surface of the cell wall 60 are covered by the HC adsorbent 63*a*, which in turn is covered by the $NO_x$ adsorbent 62*a*. In other words, the HC adsorbent 63*a* and the $NO_x$ adsorbent 62*a* are stacked in that order on the exhaust gas downstream side surface of the cell wall 60. In this case, too, the $NO_x$ adsorbent 62*a* is arranged on the exhaust gas downstream side of the HC adsorbent 63*a* and the cell wall 60, and therefore the $NO_x$ adsorbent 62*a* is prevented from being poisoned by the particulates and HC. Thus, the $NO_x$ adsorption capacity of the $NO_x$ adsorbent 62*a* can be maintained.

Figure 10:
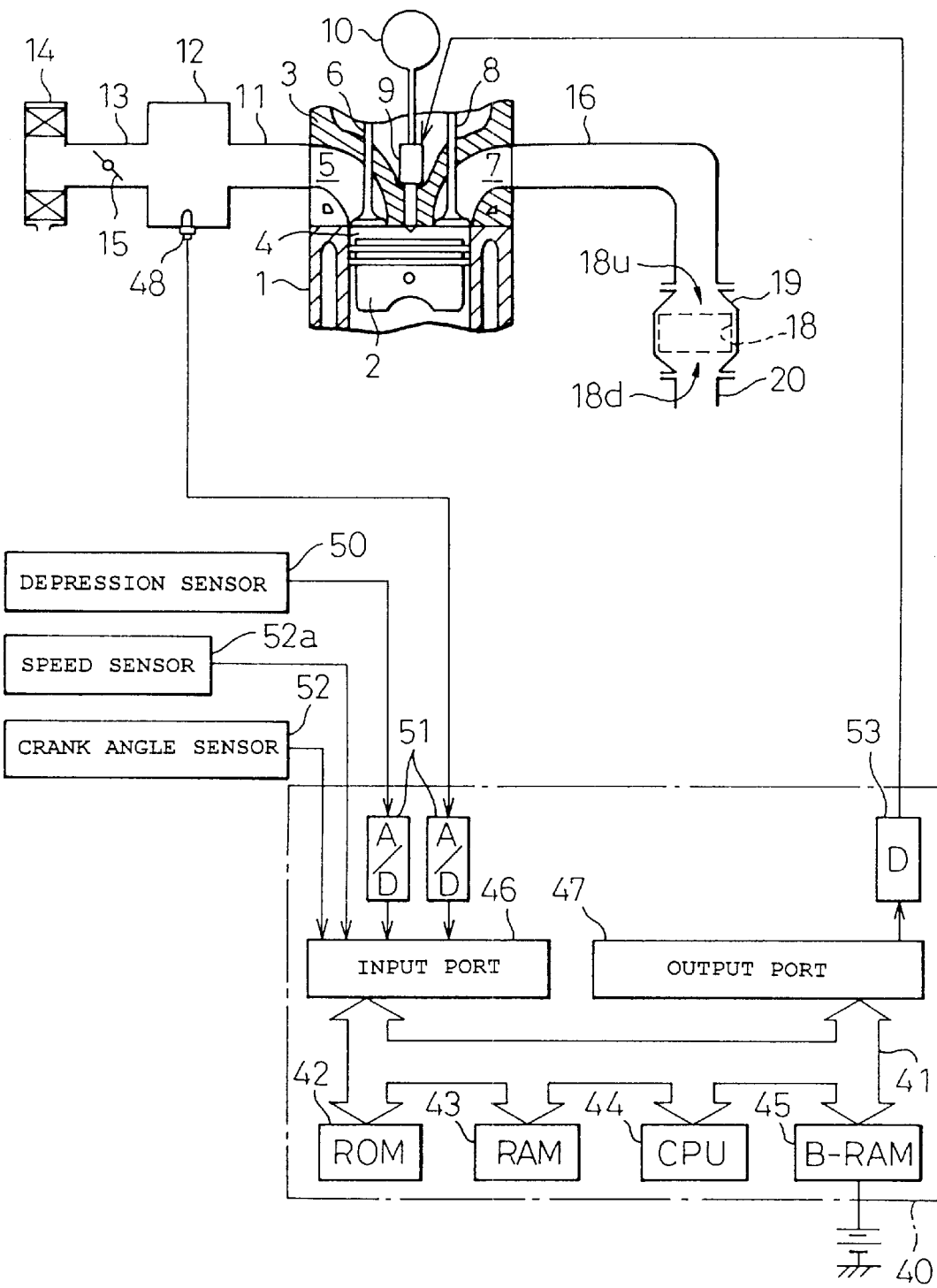
FIG. 10 is a general view of the diesel engine according to another embodiment.

FIG. 10 shows another embodiment.

Figure 11:
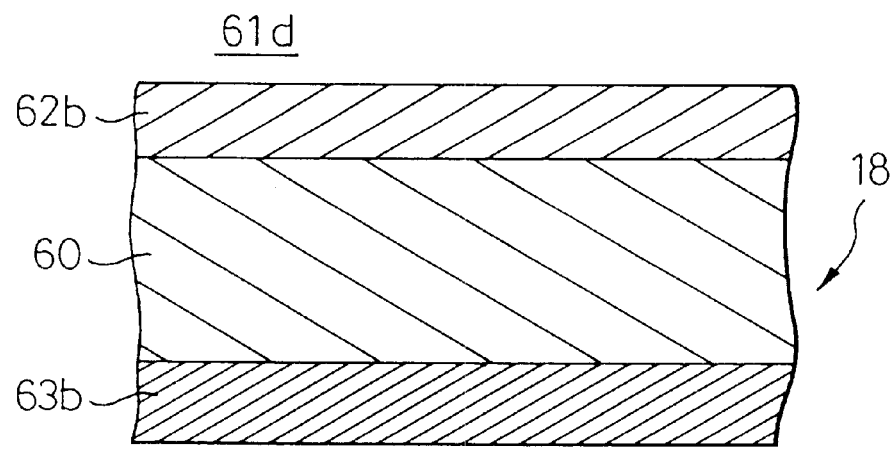
FIG. 11 is a partially enlarged sectional view of a particulate filter according to the embodiment of FIG. 10, FIGS. 12A and 12B are views for explaining the operation of absorbing and releasing $NO_x$.

Referring to FIG. 10, the exhaust manifold 16 is connected to the catalyst converter 19. The exhaust pipes 17, 22, the bypass pipe 21, the secondary air pump 23, the secondary air introduction pipe 24, the switch valves 25, 26, and the actuators 27, 28 are not provided. Also, as shown in FIG. 11, the $NO_x$ storing member 62 on the inner wall surface of the downstream end open cells 61d is formed of a $NO_x$ absorbent 62b, and the poisoning material removing member 63 on the inner wall surface of the upstream end open cells 61u is formed of a $SO_x$ absorbent 63b.

The $NO_x$ absorbent 62b is comprised of at least one selected from an alkali metal such as potassium K, sodium Na, lithium Li or cesium Cs, an alkali earth metal such as barium Ba or calcium Ca, and a rare earth metal such as lanthanum La or yttrium Y, and a precious metal such as platinum Pt, palladium Pd or rhodium Rh carried on a carrier of alumina, for example. If a ratio of the total amount of air to the total amount of fuel and the reducing agent supplied into the exhaust passage upstream of a given point, the combustion chamber and the intake passage is referred to as an air-fuel ratio of the exhaust gas flowing at the given point, the $NO_x$ absorbent 62b performs a $NO_x$ absorbing and releasing function in which it absorbs $NO_x$ therein when the air-fuel ratio of the inflowing exhaust gas is lean, and releases the absorbed $NO_x$ therefrom when the oxygen concentration in the inflowing exhaust gas becomes lower.

Figure 12A:
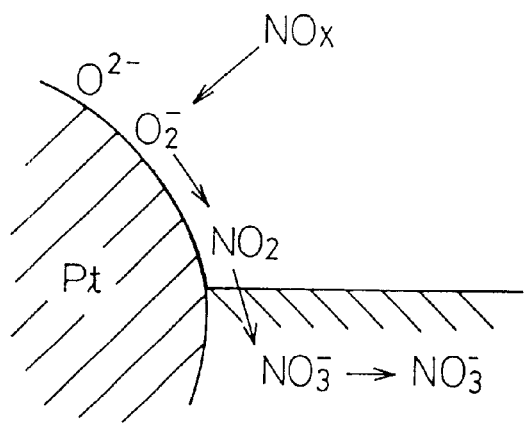
Figure 12B:
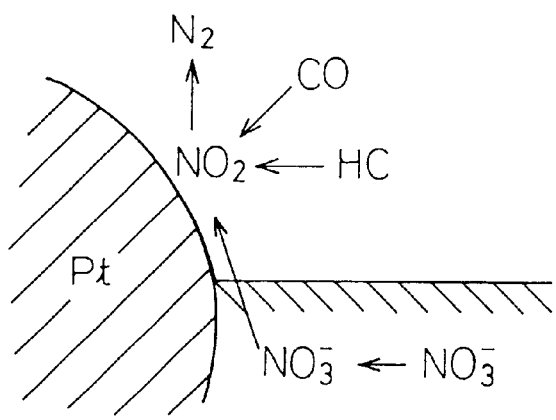

The $NO_x$ absorbent described above, if arranged in the exhaust passage of the engine, actually performs the $NO_x$ absorbing and releasing function. The detailed mechanism of this absorbing and releasing function, however, is not yet completely clear. Nevertheless, this absorbing and releasing function is considered to be performed by a mechanism as shown in FIGS. 12A and 12B. Next, as an example, an explanation will be given of the mechanism in which platinum Pt and barium Ba are carried on the carrier. A similar mechanism can be realized also with other metals such as a precious metal, an alkali metal, an alkali earth metal or a rare earth metal.

Specifically, when the air-fuel ratio of the inflowing exhaust gas turns considerably lean, the oxygen concentration in the inflowing exhaust gas considerably increases, and as shown in FIG. 12A, the oxygen $O_2$ adheres to the surface of platinum Pt in the form of $O_2^-$ or $O_2^-$. On the other hand, NO in the inflowing exhaust gas reacts with $O_2^-$ or $O_2^-$ on the surface of platinum Pt and becomes $NO_2$ ($2NO + O_2 \rightarrow 2NO_2$). Then, a part of $NO_2$ generated is further oxidized on platinum Pt while being absorbed into the absorbent and combined with barium oxide BaO. Then, it is diffused in the absorbent in the form of nitrate ions $NO_3^-$, as shown in FIG. 12A. In this way, $NO_x$ is absorbed into the absorbent.

As long as the oxygen concentration in the inflowing exhaust gas remains high, $NO_2$ is generated on the surface of platinum Pt, and as long as the $NO_x$ absorption capacity of the absorbent remains unsaturated, $NO_2$ is absorbed into the absorbent thereby to generate nitrate ions $NO_3^-$. When the oxygen concentration in the inflowing exhaust gas becomes lower and the amount of $NO_2$ generated becomes smaller, in contrast, the reaction proceeds in reverse direction ($NO_3^- \rightarrow NO_2$), so that the nitrate ions $NO_3^-$ in the absorbent are released from the absorbent in the form of $NO_2$. Specifically, the reduction in the oxygen concentration of the inflowing exhaust gas causes $NO_x$ to be released from the $NO_x$ absorbent. When the air-fuel ratio of the inflowing exhaust gas turns to rich side, the oxygen concentration of the inflowing exhaust gas decreases. Therefore, turning the air-fuel ratio of the inflowing exhaust gas to rich side causes $NO_x$ to be released from the $NO_x$ absorbent.

In this case, if the air-fuel ratio of the inflowing exhaust gas is turned rich, a reducing agent such as HC and CO of high concentration is contained in the exhaust gas flowing into the $NO_x$ absorbent. These HC and CO are oxidized by reacting with the oxygen $O_2^-$ or $O^{2-}$ on platinum Pt. Also, when the air-fuel ratio of the inflowing exhaust gas is turned rich, the oxygen concentration of the inflowing exhaust gas extremely decreases. Thus, $NO_2$ is released from the absorbent. This $NO_2$ is reduced by reacting with HC and CO as shown in FIG. 12B. When $NO_2$ disappears from the surface of platinum Pt in this way, $NO_2$ is released successively from the absorbent. When the air-fuel ratio of the inflowing exhaust gas is turned rich, therefore, $NO_x$ is released from the $NO_x$ absorbent within a short time.

As described above, the mean air-fuel ratio of the air-fuel mixture combusted in the combustion chamber 4 of the diesel engine is normally kept leaner than the stoichiometric air-fuel ratio. Thus, the air-fuel ratio of the exhaust gas flowing into the $NO_x$ absorbent 62b in the process turns lean. As a result, $NO_x$ discharged from the combustion chamber 4 in the process is absorbed in the $NO_x$ absorbent 62b and thus is prevented from being discharged into the atmosphere.

According to this embodiment, the releasing of $NO_x$ from the $NO_x$ absorbent 62a is performed in accordance with the amount of $NO_x$ absorbed in the $NO_x$ absorbent 62b. Specifically, the amount of $NO_x$ absorbed in the $NO_x$ absorbent 62b is estimated based on the engine operating conditions, for example, and when this estimated $NO_x$ amount absorbed is larger than a preset value (for example, 50% of the maximum $NO_x$ amount absorbed in the $NO_x$ absorbent 62b), the air-fuel ratio of the exhaust gas flowing into the $NO_x$ absorbent 62b is turned rich temporarily. In this way, $NO_x$ is released from the $NO_x$ absorbent 62b and thus the $NO_x$ absorption capacity of the $NO_x$ absorbent 62b is restored, while at the same time the released $NO_x$ is reduced. On the other hand, as described above, with the increase in the accumulated value of the engine load, the accumulated value of the $NO_x$ amount discharged from the engine increases, and therefore the amount of $NO_x$ absorbed in the $NO_x$ absorbent 62b increases. In view of this, the accumulated value SQ of the engine load is determined, and when this accumulated value SQ exceeds an upper threshold UTQN, it is judged that the estimated absorbed $NO_x$ amount has exceeded the preset value.

If the air-fuel ratio of the air-fuel mixture burnt in the combustion chamber 4 is turned rich, the air-fuel ratio of the exhaust gas flowing into the absorbent 62b can be turned rich. With the diesel engine, however, the air-fuel ratio of the air-fuel mixture burnt in the combustion chamber 4 is kept lean, as described above. On the other hand, the air-fuel ratio of the exhaust gas flowing into the $NO_x$ absorbent 62b can be controlled by the secondary fuel injection. According to this embodiment, the air-fuel ratio of the exhaust gas flowing into the $NO_x$ absorbent 62b is turned rich by the secondary fuel injection. Note that the secondary fuel injection for releasing $NO_x$ from the $NO_x$ absorbent 62b in this way is referred to as a $NO_x$ releasing secondary fuel injection.

The fuel and the engine lubricant oil contain sulfur. Therefore, $SO_x$ is discharged from the combustion chamber 4. This $SO_x$ is also absorbed in the $NO_x$ absorbent 62b together with $NO_x$. The mechanism of absorbing $SO_x$ in the $NO_x$ absorbent 62b is considered the same as that of absorbing $NO_x$. Specifically, as in the case of the $NO_x$ absorption mechanism, an explanation will be given with reference to the case in which platinum Pt and barium Ba are carried on the carrier. As described above, when the air-fuel ratio of the inflowing exhaust gas is lean, the oxygen $O_2$ adheres on the surface of platinum Pt in the form of $O_2^-$ or $O^{2-}$, and $SO_2$ in the inflowing exhaust gas is converted into $SO_3$ by reaction with $O_2^-$ or $O^{2-}$ on the surface of platinum Pt. Then, $SO_3$ thus generated is oxidized further on platinum Pt, and while being absorbed into the absorbent and coupled with barium oxide BaO, is diffused into the absorbent in the form of sulfate ions $SO_4^{2-}$. Then, the sulfate ions $SO_4^{2-}$ are combined with barium ions $Ba^{2+}$ to thereby generate sulfate $BaSO_4$.

This sulfate $BaSO_4$ is hard to decompose. Even when the air-fuel ratio of the inflowing exhaust gas is turned rich, almost no $SO_x$ is released from the $NO_x$ absorbent 62b. With the lapse of time, therefore, the amount of sulfate $BaSO_4$ in the $NO_x$ absorbent 62b increases. This reduces the amount of $NO_x$ that can be absorbed in the $NO_x$ absorbent 62b with the lapse of time.

In view of this, according to this embodiment, a $SO_x$ absorbent 63b is arranged upstream of the $NO_x$ absorbent 62b in order for $SO_x$ not to flow into the $NO_x$ absorbent 62b. This $SO_x$ absorbent 63b absorbs $SO_x$ when the air-fuel ratio of the inflowing exhaust gas is lean, and releases the absorbed Sox when the temperature of the $SO_x$ absorbent 63b is higher than a $SO_x$ release temperature and when the oxygen concentration in the inflowing exhaust gas becomes lower. As a result, $SO_x$ discharged from the engine running under normal conditions is absorbed in the $SO_x$ absorbent 63b, so that only $NO_x$ is absorbed in the $NO_x$ absorbent 62b.

However, the $SO_x$ absorption capacity of the $SO_x$ absorbent 63b has its limitation. Before the $SO_x$ absorption capacity of the $SO_x$ absorbent 63b is saturated, therefore, $SO_x$ is required to be released from the $SO_x$ absorbent 63b. According to this embodiment, the amount of $SO_x$ absorbed in the $SO_x$ absorbent 63b is determined, and when this $SO_x$ amount exceeds a preset value (for example, 50% of the maximum $SO_x$ amount absorbed in the $SO_x$ absorbent 63b), the temperature of the $SO_x$ absorbent 63b is temporarily increased beyond the $SO_x$ release temperature. At the same time, the air-fuel ratio of the exhaust gas flowing into the $SO_x$ absorbent 63b is temporarily turned rich, whereby $SO_x$ is released from the $SO_x$ absorbent 63b thereby to restore the $SO_x$ absorption capacity of the $SO_x$ absorbent 63b.

As described above, the secondary fuel injection can increase the temperature of the exhaust gas and enrich the air-fuel ratio. According to this embodiment, therefore, the secondary fuel injection is carried out when $SO_x$ is to be released from the $SO_x$ absorbent 63b. In this way, the temperature of the $SO_x$ absorbent 63b is increased temporarily beyond the $SO_x$ release temperature while at the same time temporarily enriching the air-fuel ratio of the exhaust gas flowing into the $SO_x$ absorbent 63b. The secondary fuel injection for releasing $SO_x$ from the $SO_x$ absorbent 63b in this way is referred to as a $SO_x$ releasing secondary fuel injection.

In order to facilitate the release of the absorbed $SO_x$ when the oxygen concentration in the inflowing exhaust gas becomes lower, the $SO_x$ absorbent 63b is required so that $SO_x$ exists in the absorbent either in the form of sulfate ions $SO_4^{2-}$, or in such a state that the sulfate $BaSO_4$, if any is generated, is not stable. The $SO_x$ absorbent 63b which makes this possible is comprised of, at least one selected from a transition metal such as iron Fe, manganese Mn, nickel Ni or tin Sn and lithium Li, which is carried on a carrier of alumina, for example.

With this $SO_x$ absorbent 63b, when the air-fuel ratio of the exhaust gas flowing into the $SO_x$ absorbent 63b is lean, the $SO_2$ contained in the exhaust gas is oxidized on the surface of the absorbent while being absorbed to the absorbent in the form of sulfate ions $SO_4^{2-}$, and is diffused in the absorbent. In this case, if platinum Pt is carried on the carrier of the $SO_x$ absorbent 63b, $SO_2$ is easily adhered on platinum Pt in the form of $SO_3^{2-}$, so that $SO_2$ is easily absorbed in the absorbent in the form of sulfate ions $SO_4^{2-}$. Thus, for the absorption of $SO_2$ to be promoted, platinum Pt is desirably carried on the carrier of the $SO_x$ absorbent 63b.

In the case where the air-fuel ratio of the exhaust gas flowing into the $SO_x$ absorbent 63b is turned rich in order to release $SO_x$ from the $SO_x$ absorbent 63b, the air-fuel ratio of the exhaust gas flowing into the $NO_x$ absorbent 62b is also rich. In the process, therefore, $SO_x$ passes through the $NO_x$ absorbent 62b without being absorbed therein. Then, this $SO_x$ flows through the downstream end open cells 61d, and flows out from the catalyst converter 19.

An exhaust purification device is known in which a $NO_x$ absorbent disposed on a honeycomb carrier, for example, is arranged in the engine exhaust passage, and a $SO_x$ absorbent is arranged in the exhaust passage upstream of the $NO_x$ absorbent. In this case, the $SO_x$ released from the $SO_x$ absorbent, as shown in FIG. 13B, flows into cells 60' defined by a cell wall 61', and then can come into contact with the $NO_x$ absorbent 62b'. Also with this exhaust gas purification device, when $SO_x$ is released from the $SO_x$ absorbent, the air-fuel ratio of the exhaust gas flowing into the $NO_x$ absorbent is rich. Therefore, the SOX, even if it comes into contact with the $NO_x$ absorbent 62b', is considered to immediately leave it. That is to say, the $SO_x$ is not considered to be absorbed in the $NO_x$ absorbent 62b. As long as oxygen remains on the surface of the $NO_x$ absorbent as immediately after turning rich the air-fuel ratio of the exhaust gas flowing into the $NO_x$ absorbent, however, $SO_x$ is absorbed in the $NO_x$ absorbent 62b' even if the air-fuel ratio of the influent exhaust gas is rich.

Figure 13A:
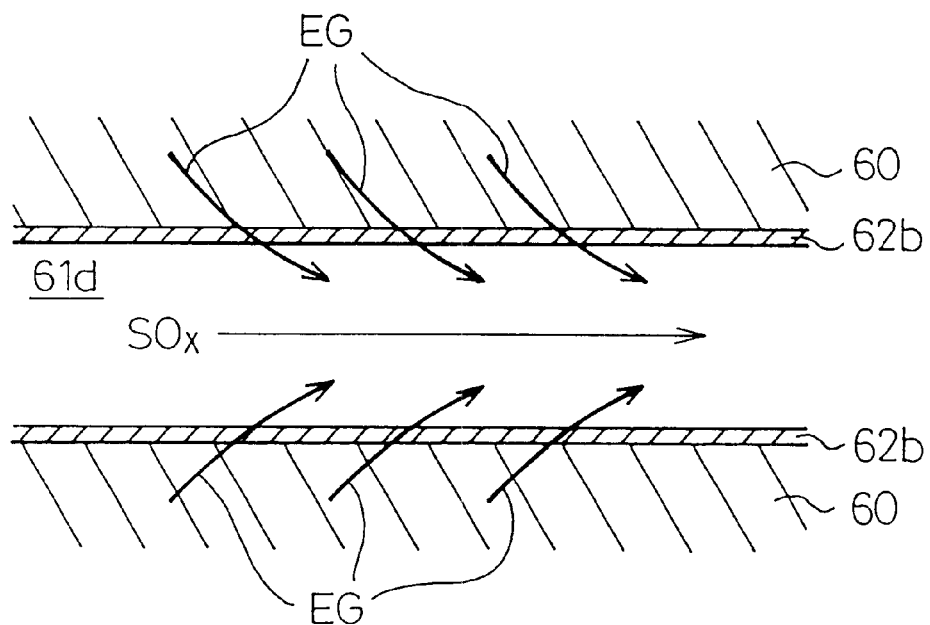
FIGS. 13A and 13B are views for explaining an exhaust gas purification method according to the embodiment of FIG. 10, FIGS. 14A and 14B are flowcharts showing an interrupt routine according to the embodiment of FIG. 10.
Figure 13B:
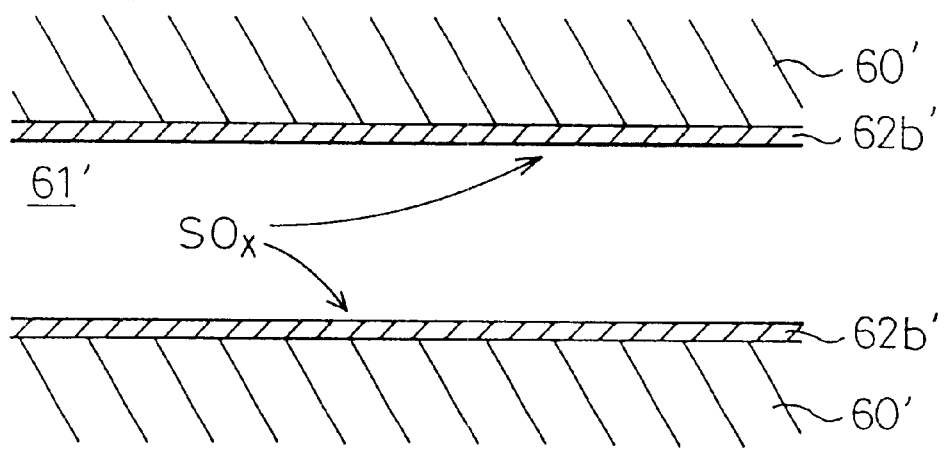

According to this embodiment, in contrast, as shown in FIG. 13A, the exhaust gas EG flows through the cell wall 60 into the downstream end open cells 61d. In addition, the exhaust gas EG flows in by way of the whole periphery of the inner wall surface of the downstream end open cells 61d. As a result, $SO_x$ flowing in the downstream end open cells 61d is hardly brought into contact with the $NO_x$ absorbent 62b, so that the amount of $SO_x$ absorbed in the $NO_x$ absorbent 62b is reduced.

To perform the regeneration of the particulate filter 18, the temperature of the particulate filter 18 is required to be increased, as described earlier. However, when the $SO_x$ release operation of the $SO_x$ absorbent 63b is complete, the temperature of the particulate filter 18 is sufficiently high for starting the regeneration. According to this embodiment, therefore, the regeneration of the particulate filter 18 is carried out as soon as the $SO_x$ releasing of the $SO_x$ absorbent 63b is completed. Specifically, the air-fuel ratio of the exhaust gas flowing into the particulate filter 18 is turned from rich to lean. As a result, the secondary fuel injection for increasing the temperature of the particulate filter 18 can be eliminated. Also, the time required for the regeneration of the particulate filter 18 can be shortened.

By supplying a small amount of reducing agent such as fuel to the particulate filter 18 during the regeneration of the particulate filter 18, the particulates trapped in the particulate filter 18 are burnt quickly. For this reason, a small amount of fuel is supplied to the particulate filter 18 by the secondary fuel injection during the regeneration of the particulate filter 18. This secondary fuel injection is referred to as a regenerating secondary fuel injection.

In this way, the regeneration of the particulate filter 18 is performed each time the $SO_x$ releasing of the $SO_x$ absorbent 63b is completed. The $SO_x$ releasing of the $SO_x$ absorbent 63b is performed in accordance with the amount of $SO_x$ absorbed in the $SO_x$ absorbent 63b. Therefore, according to this embodiment, the regeneration of the particulate filter 18 is conducted in accordance with the amount of $SO_x$ absorbed in the $SO_x$ absorbent 63b. On the other hand, during the $SO_x$ releasing of the $SO_x$ absorbent 63b, the air-fuel ratio of the exhaust gas flowing into the $NO_x$ absorbent 62b is made rich. Thus, the $NO_x$ releasing is also performed. According to this embodiment, therefore, the $NO_x$ releasing of the $NO_x$ absorbent 62b is conducted in accordance with the amount of $SO_x$ absorbed in the $SO_x$ absorbent 63b.

When performing the $NO_x$ releasing of the $NO_x$ absorbent 62b, the air-fuel ratio of the exhaust gas flowing into the $SO_x$ absorbent 63b is rich. In the case where the temperature of the $SO_x$ absorbent 63b is higher than the $SO_x$ release temperature in the process, therefore, $SO_x$ is released from the $SO_x$ absorbent 63b. If, however, the $SO_x$ flows into the $NO_x$ absorbent 62b, the $SO_x$ is undesirably liable to be absorbed in the $NO_x$ absorbent 62b. According to this embodiment, therefore, the fuel injection timing and the fuel injection amount for the $NO_x$ releasing secondary fuel injection are determined in such a manner that $SO_x$ may not be released from the $SO_x$ absorbent 63b, i.e. in such a manner that the temperature of the $SO_x$ absorbent 63b may not exceed the $SO_x$ release temperature during the $NO_x$ release operation.

Figure 14A:
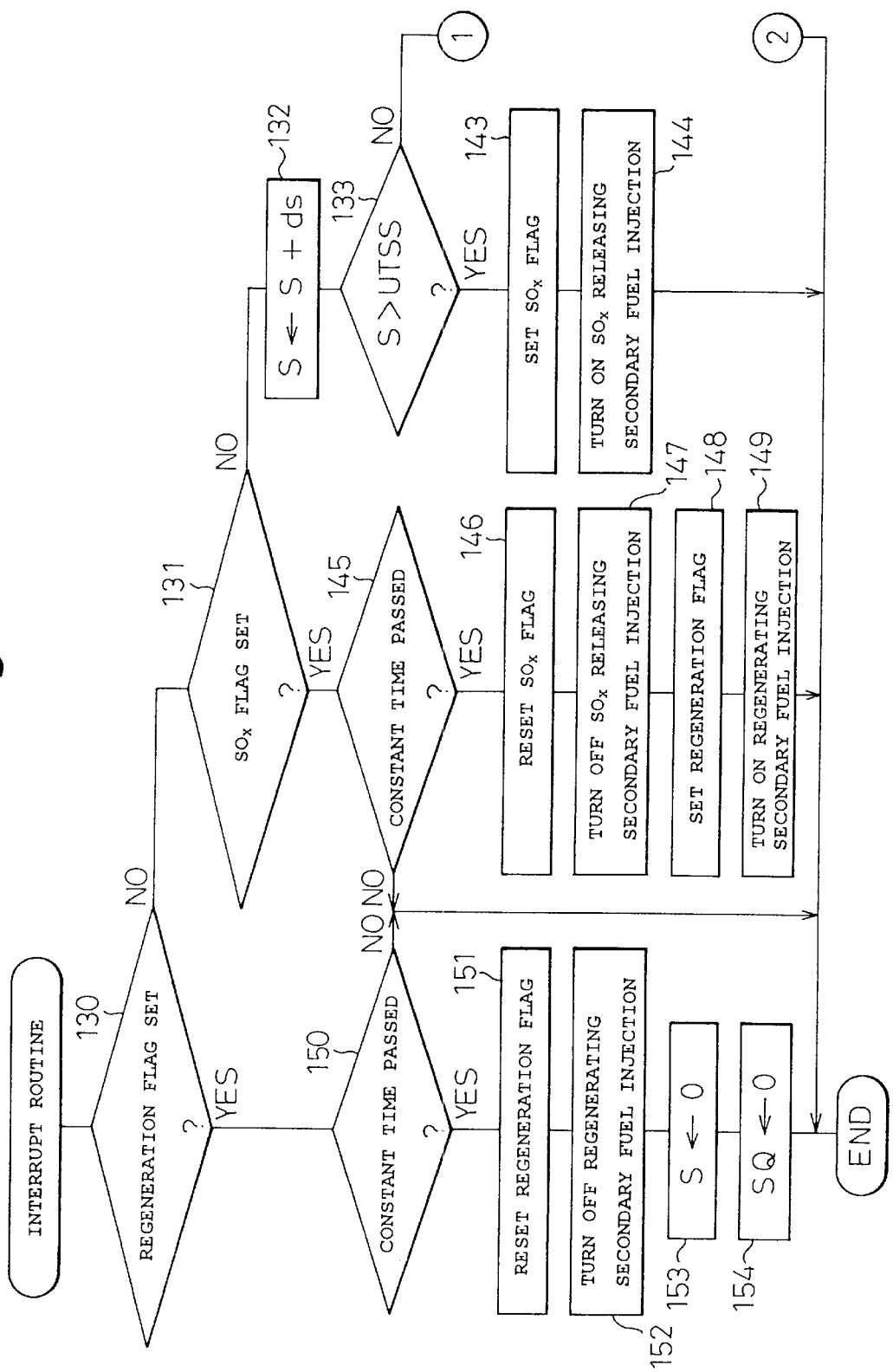
Figure 14B:
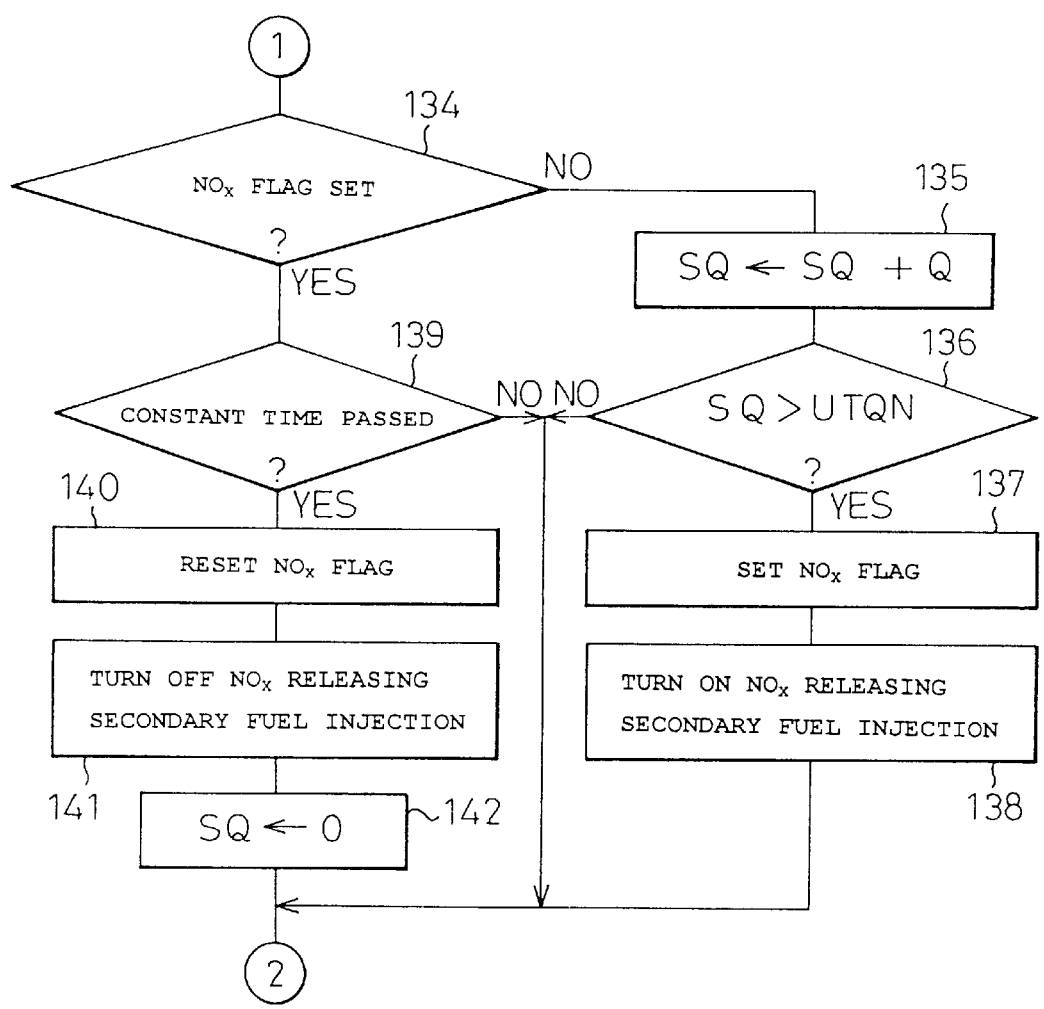

FIGS. 14A and 14B show the routine for executing the embodiment described above. This routine is executed by an interrupt for each preset time.

Referring to FIGS. 14A and 14B, first, in step 130, it is judged whether a regeneration flag is set, which is set when the regeneration of the particulate filter 18 is to be performed, and is reset otherwise. In the case where the regeneration flag is reset, the process proceeds to step 131, where it is judged whether a $SO_x$ flag is set, which is set when the $SO_x$ releasing from the $SO_x$ absorbent 63b is to be performed, and is reset otherwise. In the case where the $SO_x$ flag is reset, the process proceeds to step 132, where the mileage ds from the previous interrupt to the present interrupt is calculated. This mileage ds is added to the accumulated mileage S. In the next step 133, it is judged whether the accumulated mileage S is larger than the upper threshold UTSS. In the case where S≦UTSS, the process proceeds to step 134, where it is judged whether a $NO_x$ flag is set, which is set when the $NO_x$ releasing from the $NO_x$ absorbent 62b is to be performed, and is reset otherwise. In the case where the $NO_x$ flag is reset, the process proceeds to step 135, where the present intake air amount Q is added to the accumulated value SQ of the intake air amount. In the next step 136, it is judged whether the accumulated value SQ is larger than the upper threshold UTQN. In the case where S≦UTQN, the processing cycle is ended. In other words, in this case, the $NO_x$ releasing and the $SO_x$ releasing are stopped.

In the case where S>UTQN, on the other hand, the process proceeds to step 137, where the $NO_x$ flag is set. In the next step 138, the $NO_x$ releasing secondary fuel injection is started. In other words, the $NO_x$ releasing from the $NO_x$ absorbent 62b is started.

When the $NO_x$ flag is set, the process proceeds from step 134 to step 139, where it is judged whether a constant time has elapsed from the start of the $NO_x$ release operation. Upon the lapse of the constant time, the process proceeds to step 140, where the $NO_x$ flag is reset. In the next step 141, the $NO_x$ releasing secondary fuel injection is stopped. In other words, the $NO_x$ releasing of the $NO_x$ absorbent 62b is ended. In the next step 142, the intake air amount accumulated value SQ is cleared.

In the case where S>UTSS in step 133, on the other hand, the process proceeds to step 143, where the $SO_x$ flag is set. In the next step 144, the $SO_x$ releasing secondary fuel injection is started.

When the $SO_x$ flag is set, the process proceeds from step 131 to step 145, where it is judged whether a constant time has passed from the start of the $SO_x$ release operation. In the case where the constant time has passed, the process proceeds to step 146, where the $SO_x$ flag is reset. In the next step 147, the $SO_x$ releasing secondary fuel injection is stopped. In other words, the $SO_x$ releasing from the $SO_x$ absorbent 63b is ended. In the next step 148, the regeneration flag is set, and in the next step 149, the regenerating secondary fuel injection is started. In other words, the regeneration of the particulate filter 18 is started.

When the regeneration flag is set, the process proceeds from step 130 to step 150, where it is judged whether a constant time has passed from the start of the regeneration of the particulate filter 18. In the case where the constant time has passed, the process proceeds to step 151, where the regeneration flag is reset. In step 152, the regenerating secondary fuel injection is stopped. In other words, the $SO_x$ releasing from the $SO_x$ absorbent 63b is ended. In the next step 153, the accumulated mileage S is cleared. In the next step 154, the intake air amount accumulated value SQ is cleared.

Figure 15:
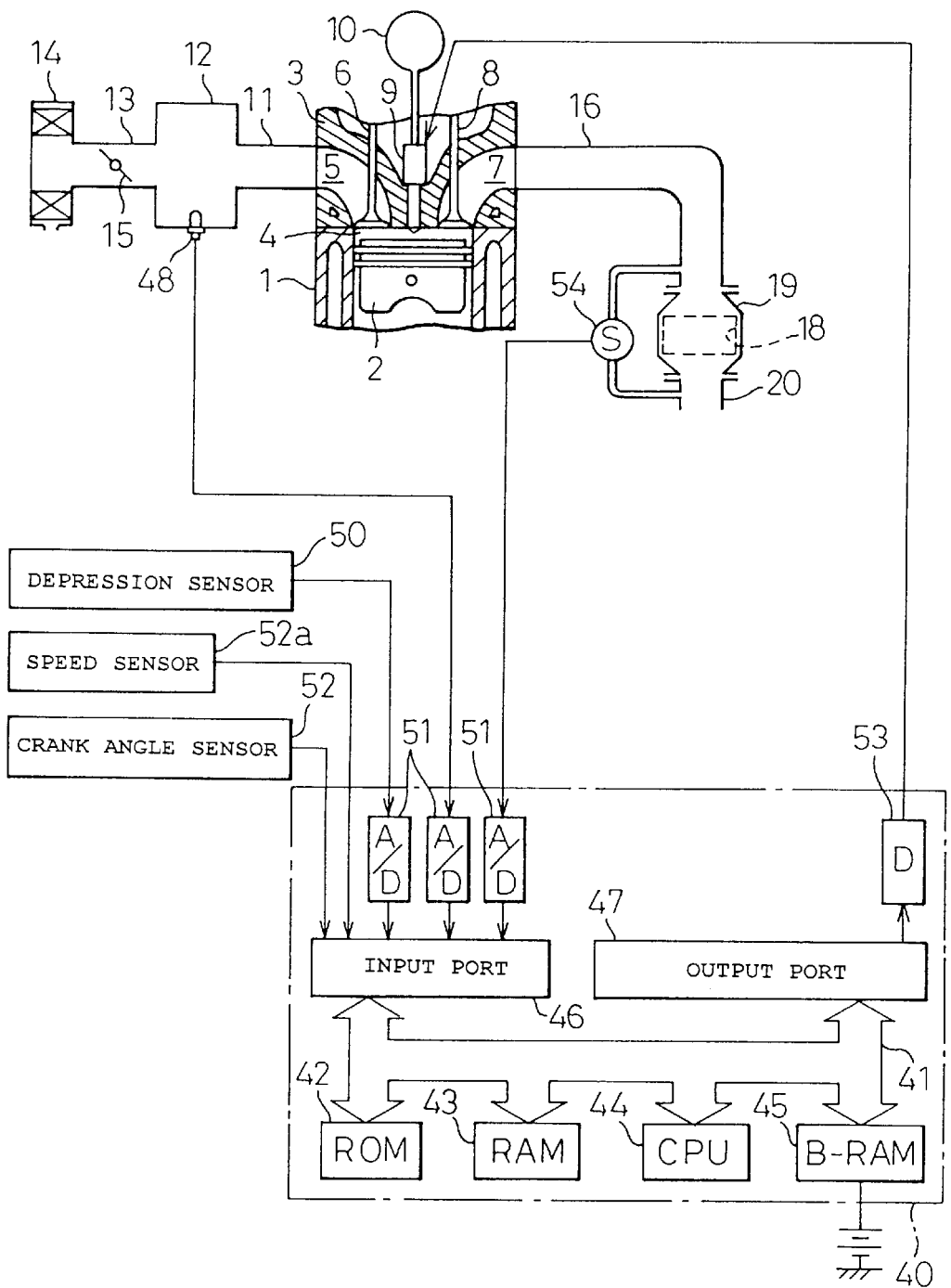
FIG. 15 is a general view of the diesel engine according to another embodiment.

Another embodiment is shown in FIG. 15.

Referring to FIG. 15, the diesel engine according to this embodiment is different in the point of a configuration from that of the diesel engine of FIG. 10 in that a pressure sensor 544 is disposed in the engine exhaust passage. This pressure sensor 54 generates an output voltage proportional to the pressure difference between the exhaust gas upstream side and the exhaust gas downstream side of a catalyst converter 19. This output voltage is input to an input port 46 of an electronic control unit 40 through a corresponding AD converter 51.

With the increase in the amount of particulates trapped in the particulate filter 18, the pressure difference PD increases between the exhaust gas upstream side and the exhaust gas downstream side of the catalyst converter 19. In view of this, according to this embodiment, when this pressure difference is larger than an upper threshold UTP, it is judged that an estimated amount of trapped particulates has exceeded a preset value (for example, 50% of the maximum amount trapped in the particulate filter 18), and the regeneration of the particulate filter 18 is performed.

As described above, the regeneration of the particulate filter 18 is desirably performed immediately after completion of the $SO_x$ release operation of the $SO_x$ absorbent 63b. According to this embodiment, therefore, when the pressure difference PD has exceeded the upper threshold UTP, the $SO_x$ releasing from the $SO_x$ absorbent 63b is performed first of all, followed by the regeneration of the particulate filter 18. Thus, in this embodiment, the $SO_x$ releasing from the $SO_x$ absorbent 63b and the $NO_x$ releasing from the $NO_x$ absorbent 62b are performed in accordance with the amount of particulates trapped in the particulate filter 18.

FIGS. 16A and 16B show the routine for executing the embodiment described above. This routine is executed by an interrupt for each preset time.

Referring to FIGS. 16A and 16B, first, in step 230, it is judged whether a regeneration flag is set, which is set when the regeneration of the particulate filter 18 is to be performed, and is reset otherwise. In the case where the regeneration flag is reset, the process proceeds to step 231, where it is judged whether a $SO_x$ flag is set, which is set when the $SO_x$ releasing from the $SO_x$ absorbent 63b is to be performed, and is reset otherwise. In the case where the $SO_x$ flag is reset, the process proceeds to step 232, where it is judged whether the pressure difference PD between the exhaust gas upstream side and the exhaust gas downstream side of the catalyst converter 19 is larger than the upper threshold UTP. In the case where PD≦UTP, the process proceeds to step 234, where it is judged whether a $NO_x$ flag is set, which is set when $NO_x$ is to be released from the $NO_x$ absorbent 62b is set, and is reset otherwise. In the case where the $NO_x$ flag is reset, the process proceeds to step 235, where the present intake air amount Q is added to the accumulated intake air amount SQ. In the next step 236, it is judged whether the accumulated value SQ is larger than the upper threshold UTQN. In the case where S≦UTQN, the processing cycle is ended. In other words, in this case, the $NO_x$ releasing and the $SO_x$ releasing are stopped.

In the case where S>UTQN, on the other hand, the process proceeds to step 237, where the $NO_x$ flag is set. In the next step 238, the $NO_x$ releasing secondary fuel injection is started. In other words, the $NO_x$ releasing from the $NO_x$ absorbent 62b is started.

In the case where the $NO_x$ flag is set, the process proceeds from step 234 to step 239, where it is judged whether a constant time has passed from the start of the $NO_x$ release operation. In the case where the constant time has passed, the process proceeds to step 240, where the $NO_x$ flag is reset. In the next step 241, the $NO_x$ releasing secondary fuel injection is stopped. In other words, the $NO_x$ release operation of the $NO_x$ absorbent 62b is ended In the next step 242, the accumulated intake air amount SQ is cleared.

In the case where PD>UTP in step 232, on the other hand, the process proceeds to step 243, where the $SO_x$ flag is set. In step 244, the $SO_x$ releasing secondary fuel injection is started.

In the case where the $SO_x$ flag is set, the process proceeds from step 231 to step 245, where it is judged whether a constant time has passed after the start of the $SO_x$ release operation. In the case there the constant time has passed, the process proceeds to step 246, where the $SO_x$ flag is reset. In the next step 247, the $SO_x$ releasing secondary fuel injection is stopped. In other words, the $SO_x$ release operation for the $SO_x$ absorbent 63b is ended. In the next step 248, the regeneration flag is set, and in the next step 249, the regenerating secondary fuel injection is started. In other words, the regeneration of the particulate filter 18 is started.

When the regeneration flag is set, the process proceeds from step 230 to step 250, where it is judged whether a constant time has passed from the start of the regeneration of the particulate filter 18. In the case where the constant time has passed, the process proceeds to step 251, where the regeneration flag is reset. In the next step 252, the regenerating secondary fuel injection is stopped. In other words, the $SO_x$ releasing from the $SO_x$ absorbent 63b is ended. In the next step 253, the accumulated mileage S is cleared. In the next step 254, the accumulated intake air amount SQ is cleared.

According to the embodiments described above, the reducing agent is supplied to the particulate filter 18, the $NO_x$ storing member 62 and the poisoning material removing member 63, by the secondary fuel injection from the fuel injectors 9. As an alternative, a reducing agent injector may be provided in the exhaust manifold 16 to inject the reducing agent from this reducing agent injection valve. In this case, hydrocarbon such as gasoline, isooctane, hexane, heptane, light oil or kerosene, hydrocarbon such as butane or propane capable of being stored in liquid form, or hydrogen can be used as a reducing agent. In spite of this, an arrangement for injecting from a reducing agent injector the same fuel as for the engine and injected from the fuel injectors 9 eliminates the need of an additional reducing agent tank.

What is claimed is:

1. An exhaust gas purification device for an internal combustion engine having an exhaust passage, comprising:
    a filter arranged in said exhaust passage for trapping the particulates in the inflowing exhaust gas, said filter having an exhaust gas inflow surface and an exhaust gas outflow surface; and
    a $NO_x$ storing member arranged only on the exhaust gas outflow surface of the filter for temporarily storing $NO_x$ in the inflowing exhaust gas therein.

2. An exhaust gas purification device according to claim 1, wherein said $NO_x$ storing member is comprised of a $NO_x$ adsorbent for adsorbing $NO_x$ in the inflowing exhaust gas therein.

3. An exhaust gas purification device according to claim 2, further comprising $NO_x$ desorbing means for desorbing $NO_x$ adsorbed in the $NO_x$ adsorbent therefrom by heating said $NO_x$ adsorbent.

4. An exhaust gas purification device according to claim 3, wherein said $NO_x$ desorbing means comprises secondary air supply means for supplying a secondary air to the $NO_x$ adsorbent when said $NO_x$ is to be desorbed from said $NO_x$ adsorbent, and means for heating said secondary air, said $NO_x$ adsorbent being heated by causing the heated secondary air to flow through said $NO_x$ adsorbent.

5. An exhaust gas purification device according to claim 4, wherein said secondary air supply means supplies the secondary air to the filter in such a manner that the secondary air flows from the exhaust gas outflow surface of said filter toward the exhaust gas inflow surface of said filter, and $NO_x$ desorbed from said $NO_x$ adsorbent is reduced by reacting with the particulates trapped in said filter.

6. An exhaust gas purification device according to claim 5, wherein said $NO_x$ desorbing means comprises means for preventing the exhaust gas discharged from the engine from flowing into said filter when said $NO_x$ desorbing means desorbs $NO_x$ from said $NO_x$ adsorbent, and said $NO_x$ desorbing means desorbs $NO_x$ from said $NO_x$ adsorbent when the engine load is lower than a preset load.

7. An exhaust gas purification device according to claim 3, further comprising reducing agent supplying means for supplying a reducing agent to said $NO_x$ adsorbent when $NO_x$ is desorbed from said $NO_x$ adsorbent, wherein $NO_x$ is reduced by said reducing agent.

8. An exhaust gas purification device according to claim 7, wherein said reducing agent supplying means comprises a HC adsorbent arranged on the exhaust gas inflow surface of said filter or on the exhaust gas outflow surface of the filter with said $NO_x$ adsorbent being deposited thereon for adsorbing the hydrocarbon in the inflowing exhaust gas, and the hydrocarbon adsorbed in said HC adsorbent is desorbed therefrom to be supplied to said $NO_x$ adsorbent when $NO_x$ is desorbed from said $NO_x$ adsorbent.

9. An exhaust gas purification device according to claim 8, wherein said reducing agent supplying means comprises a fuel injector for injecting fuel directly into a cylinder, and hydrocarbon is supplied to said HC adsorbent by injecting a secondary fuel from said fuel injector when the engine is in an expansion stroke or in an exhaust stroke.

10. An exhaust gas purification device according to claim 3, further comprising means for increasing the temperature of the exhaust gas flowing into said $NO_x$ adsorbent when desorbing $NO_x$ from said $NO_x$ adsorbent, wherein said $NO_x$ adsorbent is heated by causing said exhaust gas to flow through said $NO_x$ adsorbent.

11. An exhaust gas purification device according to claim 2, wherein said $NO_x$ adsorbent is composed of at least one selected from: a precious metal including palladium, platinum and rhodium; a transition metal including copper and iron; and lithium.

12. An exhaust gas purification device according to claim 1, wherein said $NO_x$ storing member is comprised of a $NO_x$ absorbent for absorbing $NO_x$ therein when the air-fuel ratio of the inflowing exhaust gas is lean and releasing and reducing the absorbed $NO_x$ when the oxygen concentration in the inflowing exhaust gas becomes lower.

13. An exhaust gas purification device according to claim 12, further comprising $NO_x$ releasing means for releasing $NO_x$ from said $NO_x$ absorbent by temporarily making the air-fuel ratio of the exhaust gas flowing into said $NO_x$ absorbent rich.

14. An exhaust gas purification device according to claim 13, further comprising a $SO_x$ absorbent arranged on the exhaust gas inflow surface of said filter or on the exhaust gas outflow surface of the filter with said $NO_x$ absorbent being deposited thereon, said $SO_x$ absorbent absorbing $SO_x$ in the inflowing exhaust gas therein when the air-fuel ratio of the inflowing exhaust gas is lean, and releasing the absorbed $SO_x$ therefrom when the oxygen concentration in the inflowing exhaust gas becomes lower while the temperature of the $SO_x$ absorbent is higher than a $SO_x$ release temperature, wherein the temperature of the $SO_x$ absorbent is prevented from being higher than said $SO_x$ release temperature when $NO_x$ is released from said $NO_x$ absorbent.

15. An exhaust gas purification device according to claim 13, wherein said $NO_x$ releasing means comprises a fuel injector for injecting fuel directly into a cylinder, and the air-fuel ratio of the exhaust gas flowing into said $NO_x$ absorbent is made rich by injecting a secondary fuel from said fuel injector when the engine is in an expansion stroke or in an exhaust stroke.

16. An exhaust gas purification device according to claim 12, wherein said $NO_x$ absorbent is comprised of: at least one selected from an alkali metal including potassium, sodium, lithium and cesium, an alkali earth metal including barium and calcium and a rare earth metal including lanthanum and yttrium; and a precious metal including palladium, platinum and rhodium.

17. An exhaust gas purification device according to claim 1, further comprising means for estimating the amount of $NO_x$ absorbed in said $NO_x$ storing member, wherein $NO_x$ stored in said $NO_x$ storing member is released when said estimated amount of $NO_x$ is larger than a preset $NO_x$ amount.

18. An exhaust gas purification device according to claim 1, further comprising poisoning material removing means arranged on the exhaust gas inflow surface of the filter or on the exhaust gas outflow surface of the filter with said $NO_x$ storing member being deposited thereon for preventing a poisoning material from reaching said $NO_x$ storing member.

19. An exhaust gas purification device according to claim 18, wherein said poisoning material removing member is comprised of a HC adsorbent for adsorbing hydrocarbon in the inflowing exhaust gas therein.

20. An exhaust gas purification device according to claim 19, wherein the stored $NO_x$ is released from said $NO_x$ storing member and caused to react with hydrocarbon when said hydrocarbon is desorbed from said HC adsorbent.

21. An exhaust gas purification device according to claim 19, wherein said HC adsorbent is comprised of at least one selected from a precious metal including platinum and palladium and a transition metal including copper and iron, carried on a carrier composed of zeolite.

22. An exhaust gas purification device according to claim 18, wherein said poisoning material removing member is comprised of a $SO_x$ absorbent, said $SO_x$ absorbent absorbing $SO_x$ in the inflowing exhaust gas therein when the air-fuel ratio of the inflowing exhaust gas is lean, and desorbing the absorbed $SO_x$ therefrom when the oxygen concentration in the influent exhaust gas becomes lower while the temperature of the $SO_x$ absorbent is higher than a $SO_x$ release temperature.

23. An exhaust gas purification device according to claim 22, wherein said filter is regenerated immediately after $SO_x$ is released from said $SO_x$ absorbent.

24. An exhaust gas purification device according to claim 22, wherein the temperature of the $SO_x$ absorbent is increased by increasing the temperature of the exhaust gas flowing into the $SO_x$ absorbent when $SO_x$ is released from said $SO_x$ absorbent.

25. An exhaust gas purification device according to claim 24, further comprising a fuel injector for injecting fuel directly into a cylinder, wherein the temperature of the exhaust gas flowing into said $SO_x$ absorbent is increased by injecting a secondary fuel from said fuel injector and burning the secondary fuel when the engine is in expansion stroke or in exhaust stroke.

26. An exhaust gas purification device according to claim 22, wherein said $SO_x$ absorbent is comprised of at least one selected from: a transition metal including iron, manganese, nickel and tin; and lithium.

27. An exhaust gas purification device according to claim 18, further comprising means for estimating the amount of the poisoning material stored in said poisoning material removing member and means for releasing the poisoning material from said poisoning material removing member when the estimated amount of said poisoning material is larger than a preset poisoning material amount.

28. An exhaust gas purification device according to claim 18, wherein the $NO_x$ releasing from said $NO_x$ storing member, the releasing of the poisoning material from said poisoning material removing member, and the regeneration of said filter are performed at the same time.

29. An exhaust gas purification device according to claim 1, further comprising filter regenerating means for burning the particulates by heating said filter while placing the filter in an oxidazing atmosphere to regenerate said filter.

30. An exhaust gas purification device according to claim 29, further comprising trapped particulate amount estimation means for estimating the amount of the particulates trapped in said filter, wherein said filter regenerating means regenerates said filter when the estimated amount of the particulates trapped in said filter is larger than a preset particulate amount.

31. An exhaust gas purification device according to claim 29, wherein the $NO_x$ releasing from said $NO_x$ storing member and the regeneration of said filter are performed at the same time.

32. An exhaust gas purification device according to claim 1, wherein said filter comprises a plurality of cells defined by a porous cell wall extending substantially in parallel to an axis of the exhaust passage, said cells including upstream end open cells with an exhaust upstream ends thereof being opened and exhaust downstream ends thereof being closed, and downstream end open cells with exhaust upstream ends thereof being closed and exhaust downstream ends thereof being opened, said upstream end open cells and said downstream end open cells being arranged alternately in repetitive fashion, and wherein said $NO_x$ storing member is arranged only on inner wall surfaces of said downstream end open cells.

33. An exhaust gas purification device for an internal combustion engine having an exhaust passage, comprising:
   a filter arranged in said exhaust passage for trapping the particulates in the inflowing exhaust gas;
   a $NO_x$ storing member arranged in said exhaust passage downstream of said filter for temporarily storing $NO_x$ in the inflowing exhaust gas therein;
   estimating means for estimating an amount of $NO_x$ stored in said $NO_x$ storing member; and
   regeneration/release means for regenerating said filter and releasing the accumulated $NO_x$ from said $NO_x$ storing member, in an oxidation atmosphere, when said estimated accumulated $NO_x$ amount is larger than a preset $NO_x$ amount, wherein said regeneration/release means releases the accumulated NOx from said NOx storing member when said filter is to be regenerated.

34. An exhaust gas purification device according to claim 33, wherein said $NO_x$ storing member is comprised of a $NO_x$ adsorbent for adsorbing $NO_x$ in the inflowing exhaust gas.

35. An exhaust gas purification device according to claim 34, wherein said regeneration/release means comprises heating means for heating said filter in an oxidation atmosphere and heating said $NO_x$ adsorbent when said filter is to be regenerated and $NO_x$ is to be desorbed from said $NO_x$ adsorbent.

36. An exhaust gas purification device according to claim 34, wherein said $NO_x$ adsorbent is comprised of at least one selected from: a precious metal including palladium, platinum and rhodium, a transition metal including copper and iron; and lithium.

37. An exhaust gas purification device according to claim 33, wherein said $NO_x$ storing member is comprised of a $NO_x$ absorbent for absorbing $NO_x$ therein when the air-fuel ratio of the inflowing exhaust gas is lean, and releasing the absorbed $NO_x$ therefrom when the oxygen concentration of the inflowing exhaust gas becomes lower.

38. An exhaust gas purification device according to claim 37, further comprising air-fuel ratio control means for heating the filter in an oxidation atmosphere and temporarily make the air-fuel ratio of the exhaust gas flowing into said $NO_x$ absorbent rich, when said filter is to be regenerated and $NO_x$ is to be released from said $NO_x$ adsorbent.

39. An exhaust gas purification device according to claim 37, wherein said $NO_x$ absorbent is comprised of: at least one selected from an alkali metal including potassium, sodium, lithium and cesium, an alkali earth metal including barium and calcium, and a rare earth metal including lanthanum and yttrium; and a precious metal including palladium, platinum and rhodium.

40. An exhaust gas purification device according to claim 33, wherein said filter has an exhaust gas inflow surface and an exhaust gas outflow surface, and said $NO_x$ storing member is arranged on the exhaust gas outflow surface of said filter.

* * * * *